United States Patent
Mabara et al.

(10) Patent No.: US 9,363,399 B2
(45) Date of Patent: Jun. 7, 2016

(54) IMAGE READING DEVICE AND COPIER

(71) Applicant: FUJI XEROX CO., LTD., Tokyo (JP)

(72) Inventors: Tsuyoshi Mabara, Yokohama (JP);
Keisuke Uchiyama, Yokohama (JP);
Akira Yamazaki, Yokohama (JP);
Kazuyuki Koda, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/506,228

(22) Filed: Oct. 3, 2014

(65) Prior Publication Data
US 2015/0249763 A1 Sep. 3, 2015

(30) Foreign Application Priority Data

Mar. 3, 2014 (JP) .................................. 2014-040424
Mar. 6, 2014 (JP) .................................. 2014-043842

(51) Int. Cl.
*H04N 1/04* (2006.01)
*H04N 1/00* (2006.01)

(52) U.S. Cl.
CPC ......... *H04N 1/00745* (2013.01); *H04N 1/0066* (2013.01); *H04N 1/00588* (2013.01); *H04N 1/00612* (2013.01); *H04N 1/00615* (2013.01); *H04N 1/00705* (2013.01); *H04N 1/00713* (2013.01); *H04N 1/00718* (2013.01); *H04N 1/00782* (2013.01); *H04N 1/00806* (2013.01); *H04N 2201/0081* (2013.01); *H04N 2201/0082* (2013.01); *H04N 2201/0094* (2013.01)

(58) Field of Classification Search
CPC .............. B65H 2701/1311; B65H 2701/1313; B65H 2511/11; B65H 2801/39; B65H 2511/51; B65H 2513/40; B65H 2701/1315; B65H 2511/10; B65H 2701/131; B65H 9/002; H04N 1/00724; H04N 1/103; H04N 1/00424
USPC ............ 358/498, 474, 497, 442; 271/265.01, 271/109, 10.01, 10.09; 399/66, 69, 124, 399/374
See application file for complete search history.

(56) References Cited

U.S. PATENT DOCUMENTS

| | | | | | |
|---|---|---|---|---|---|
| 4,506,978 | A | * | 3/1985 | Allocco et al. | 399/367 |
| 5,191,438 | A | * | 3/1993 | Katsurada et al. | 382/290 |
| 5,209,465 | A | * | 5/1993 | Sayama et al. | 271/110 |
| 5,273,269 | A | * | 12/1993 | Iwanaga | B65H 3/5238 271/124 |
| 5,465,172 | A | * | 11/1995 | Fukushima et al. | 358/498 |
| 6,064,464 | A | * | 5/2000 | Yamada | 355/40 |
| 6,145,834 | A | * | 11/2000 | Hirota et al. | 271/225 |
| 6,243,123 | B1 | * | 6/2001 | Tanimoto | H04N 1/0473 347/235 |
| 6,301,022 | B1 | * | 10/2001 | Washio et al. | 358/488 |
| 6,646,768 | B1 | * | 11/2003 | Andersen et al. | 358/474 |

(Continued)

FOREIGN PATENT DOCUMENTS

| | | |
|---|---|---|
| JP | A-2010-21832 | 1/2010 |
| JP | A-2010-206696 | 9/2010 |

*Primary Examiner* — Negussie Worku
(74) *Attorney, Agent, or Firm* — Oliff PLC

(57) ABSTRACT

An image reading device includes: a supplying tray on which a document is placed; a document conveyer that successively conveys the document placed on the supplying tray toward a reading position; a plurality of detection sensors that are disposed in a plurality of positions in a width direction intersecting a conveyance direction of the document, and detect a front edge of the document in the conveyance direction when the document is placed on the supplying tray; and a document reading portion that reads an image on the document passing the reading position, and generates an image signal.

17 Claims, 18 Drawing Sheets

(56) References Cited

U.S. PATENT DOCUMENTS

| | | | |
|---|---|---|---|
| 7,891,292 B2* | 2/2011 | Takahashi | B41L 13/06 101/116 |
| 7,905,484 B2* | 3/2011 | Komuro | B65H 3/0684 271/10.03 |
| 9,197,775 B2* | 11/2015 | Koda | H04N 1/0079 |
| 2002/0039207 A1* | 4/2002 | Kanda | H04N 1/00681 358/498 |
| 2002/0074711 A1* | 6/2002 | Higaki | 271/117 |
| 2003/0038989 A1* | 2/2003 | Yokota et al. | 358/474 |
| 2004/0217537 A1* | 11/2004 | Ohama | 271/3.14 |
| 2008/0127841 A1* | 6/2008 | Takahashi | B41L 13/06 101/129 |
| 2008/0239416 A1* | 10/2008 | Kato et al. | 358/498 |
| 2009/0160119 A1* | 6/2009 | Komuro | B65H 3/0684 271/10.11 |
| 2009/0289408 A1* | 11/2009 | Hamada et al. | 271/3.14 |
| 2012/0105886 A1* | 5/2012 | Takai et al. | 358/1.13 |
| 2012/0119432 A1* | 5/2012 | Kambayashi et al. | 271/10.02 |
| 2012/0236375 A1* | 9/2012 | Fujita et al. | 358/498 |
| 2014/0009767 A1* | 1/2014 | Tanigawa et al. | 358/1.2 |

* cited by examiner

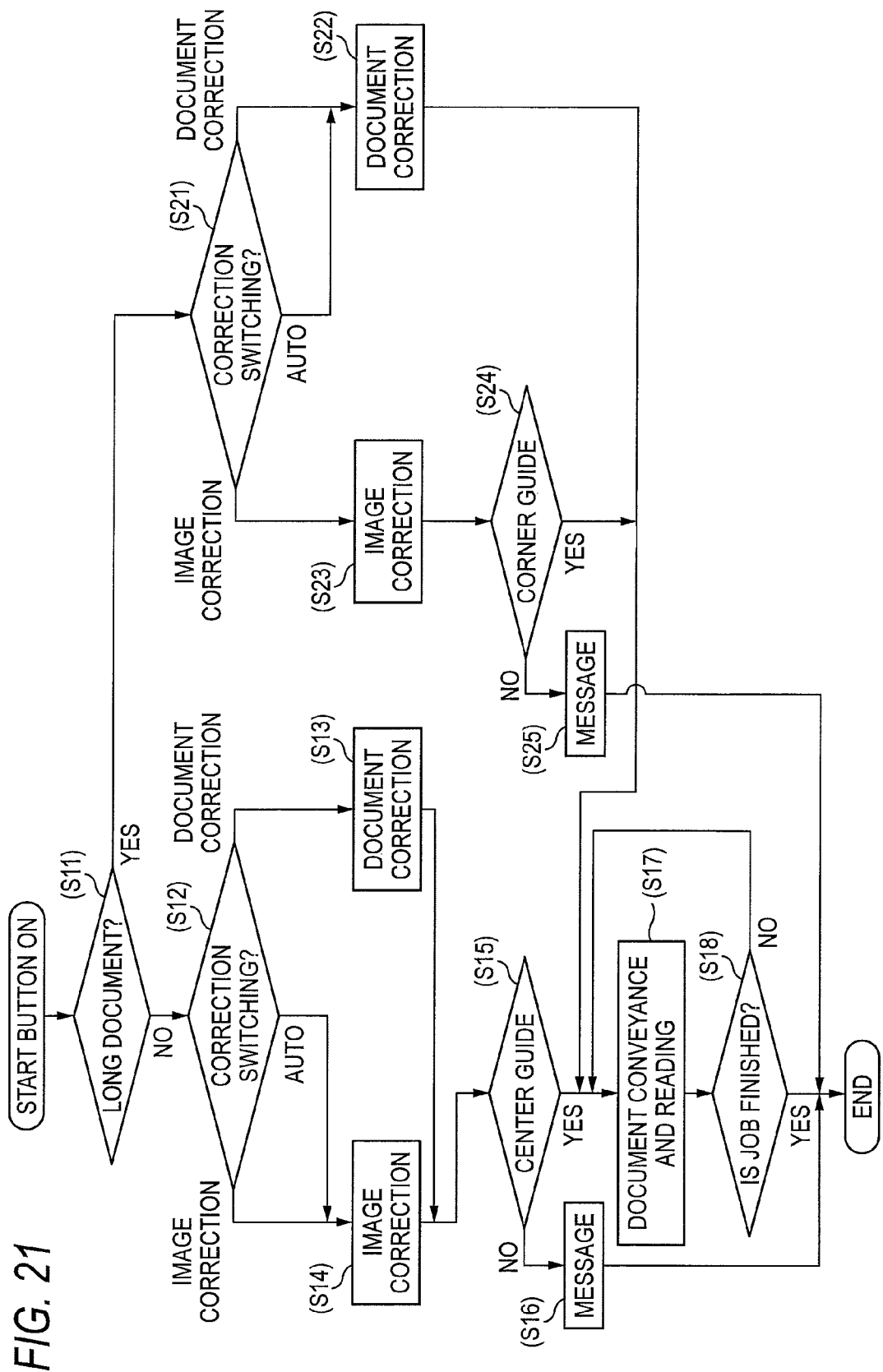

IMAGE READING DEVICE AND COPIER

CROSS-REFERENCE TO RELATED APPLICATIONS

This application is based on and claims priority under 35 USC 119 from Japanese Patent Application No. 2014-040424 filed on Mar. 3, 2014 and Japanese Patent Application No. 2014-043842 filed on Mar. 6, 2014.

BACKGROUND

Technical Field

The present invention relates to an image reading device and a copier.

SUMMARY

According to an aspect of the invention, there is provided an image reading device provided with:

a supplying tray on which a document is placed;

a document conveyer that successively conveys the document placed on the supplying tray toward a reading position;

a plurality of detection sensors that are disposed in a plurality of positions in a width direction intersecting a conveyance direction, and detect a front edge of the document in the conveyance direction when the document is placed on the supplying tray; and a document reading portion that reads an image on the document passing the reading position and generates an image signal.

BRIEF DESCRIPTION OF THE DRAWINGS

Exemplary embodiments of the present invention will be described in detail based on the following figures, wherein:

FIG. 21 is a flowchart showing a second example of the operation sequence of the image reading device when the start button shown in FIG. 13 is depressed.

DESCRIPTION OF REFERENCE NUMERALS AND SIGNS

Figure 1:
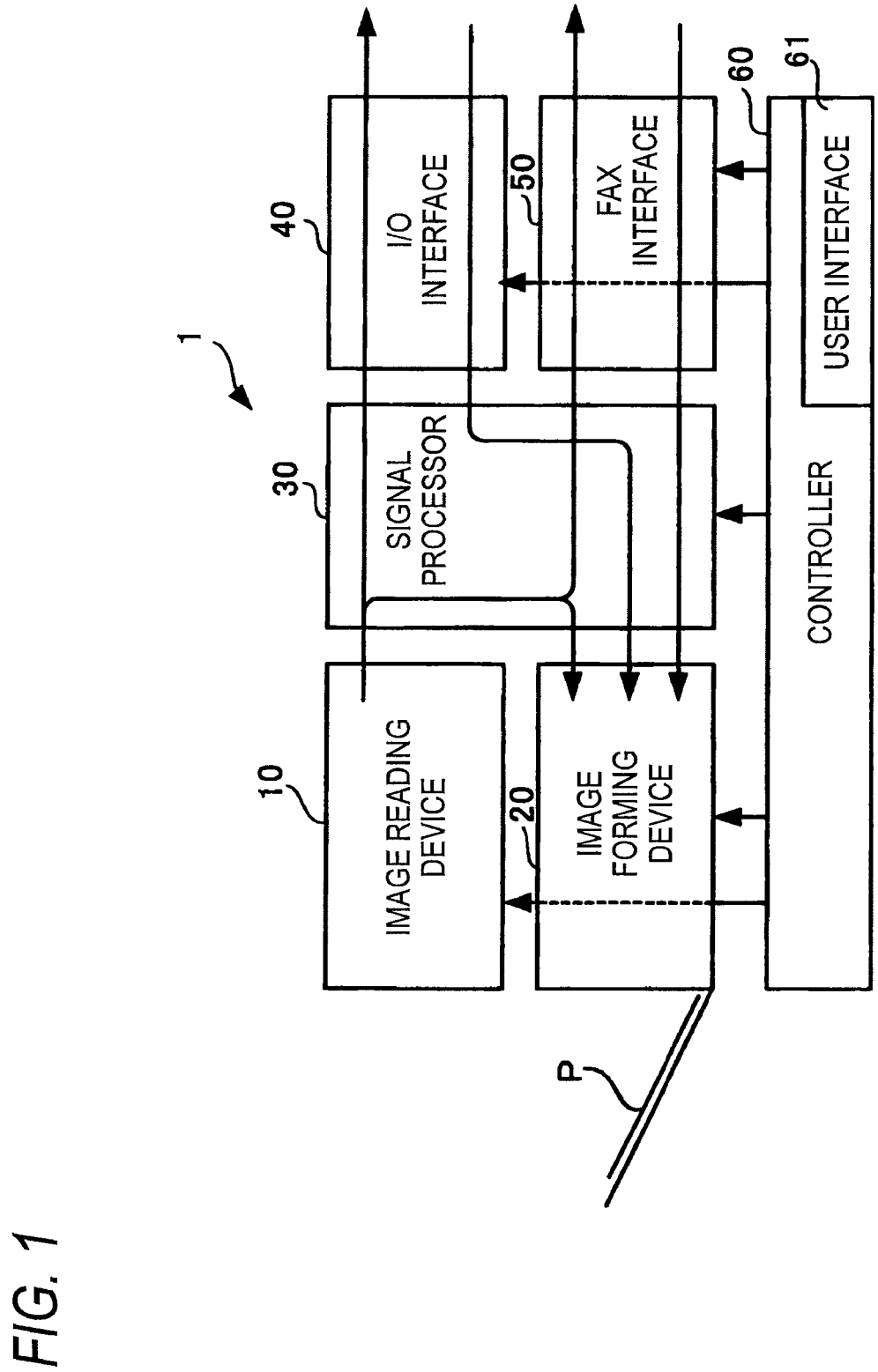
FIG. 1 is a block diagram of a multifunction apparatus including an image reading device and a copier as a first and second exemplary embodiments of the present invention.

1 Multifunction apparatus
10 Image reading device
11 Document tray
20 Image forming device
30 Signal processor
40 I/O interface
50 FAX interface
60 Controller
61 User interface
75 Document placement setting screen
80 Correction switching setting screen
118 Document conveyance opening
119 Set sensor
611 Start button
612 Setting button
613 Touch panel
12 Document ejection tray
70 Circuit portion
91 Long document setting button
117, 117a, 117b Guide member
110 Opening and closing cover
136 Reading sensor
701a, 701b Slide arm
702a, 702b Rack gear
710 Pinion gear

DETAILED DESCRIPTION

Hereinafter, exemplary embodiments of the present invention will be described.

First Exemplary Embodiment

FIG. 1 is a block diagram of a multifunction apparatus including an image reading device and a copier as an exemplary embodiment of the present invention.

This multifunction apparatus 1 is provided with an image reading device 10 and an image forming device 20.

At the image reading device 10, an image on a document is read, an image signal is generated, and the image signal is inputted to a later-described signal processor 30 and undergoes various kinds of signal processing. In this image reading device 10, a document where an image to be read is recorded is conveyed on a conveyance path passing a reading position, and when the document passes the reading position, the image on the document is read. This image reading device 10 corresponds to an example of the image forming device referred to in the present invention. Details will be described later.

Moreover, at the image forming device 20, an image based on the image signal is formed on a sheet, and the sheet P where the image has been formed is ejected from this image forming device 20. While a so-called electrophotographic image forming device is borne in mind in this description, this image forming device 20 is not necessarily electrophotographic but may be an image forming device of the inkjet or other type.

As described below, the image formed on the sheet P by this image forming device 20 is not necessarily an image signal obtained by the reading of an image on a document at the image reading device 10 but may be an externally inputted image signal.

This multifunction apparatus 1 is provided with the signal processor 30. In this signal processor 30, an image signal obtained at the image reading device 10 and an externally inputted image signal undergo various kinds of signal processing according to the mode thereof.

Further, this multifunction apparatus 1 is provided with an I/O interface 40 and a FAX interface 50.

The I/O interface 40 performs communication between this multifunction apparatus 1 and an image editing device (not shown) typically formed of a computer. The I/O interface 40 receives the image signal obtained at the image reading device 10, by way of the signal processor 30, and transmits it to the image editing device. In this case, this multifunction apparatus 1 performs the function as a scanner. Moreover, at the I/O interface 40, the image signal transmitted from the image editing device is received. The image signal received at this I/O interface 40 is transmitted to the image forming device 20 by way of the signal processor 30. At the image forming device 20, an image is formed on a sheet based on the transmitted image signal. In this case, this multifunction apparatus 1 performs the function as a printer.

Moreover, the FAX interface 50 is a module connected to the telephone line and performing the facsimile function. That is, in a FAX transmission mode, a document where an image for facsimile transmission is recorded is read and an image signal is generated at the image reading device 10, and the generated image signal is sent out to the telephone line to the receiver by way of the signal processor 30 and the FAX interface 50. Moreover, in the FAX transmission mode, the image signal transmitted through the telephone line is received at the FAX interface 50, and inputted to the image forming device 20 by way of the signal processor 30. At the image forming device 20, an image based on the inputted image signal is printed out onto a sheet.

Further, this multifunction apparatus 1 has a copy function. In a copy mode, the image signal obtained by reading a document at the image reading device 10 is inputted to the image forming device 20 by way of the signal processor 30, and at this image forming device 20, an image based on the inputted image signal is printed out onto a sheet. This copy function corresponds to an example of the copier referred to in the present invention.

Further, this multifunction apparatus 1 is provided with a controller 60. This controller 60 includes a user interface 61. This controller 60 performs the above-described various functions, mode switching control and others, that is, all the controls necessary for this multifunction apparatus 1 according to a user instruction from the user interface 61 and the like.

Figure 2:
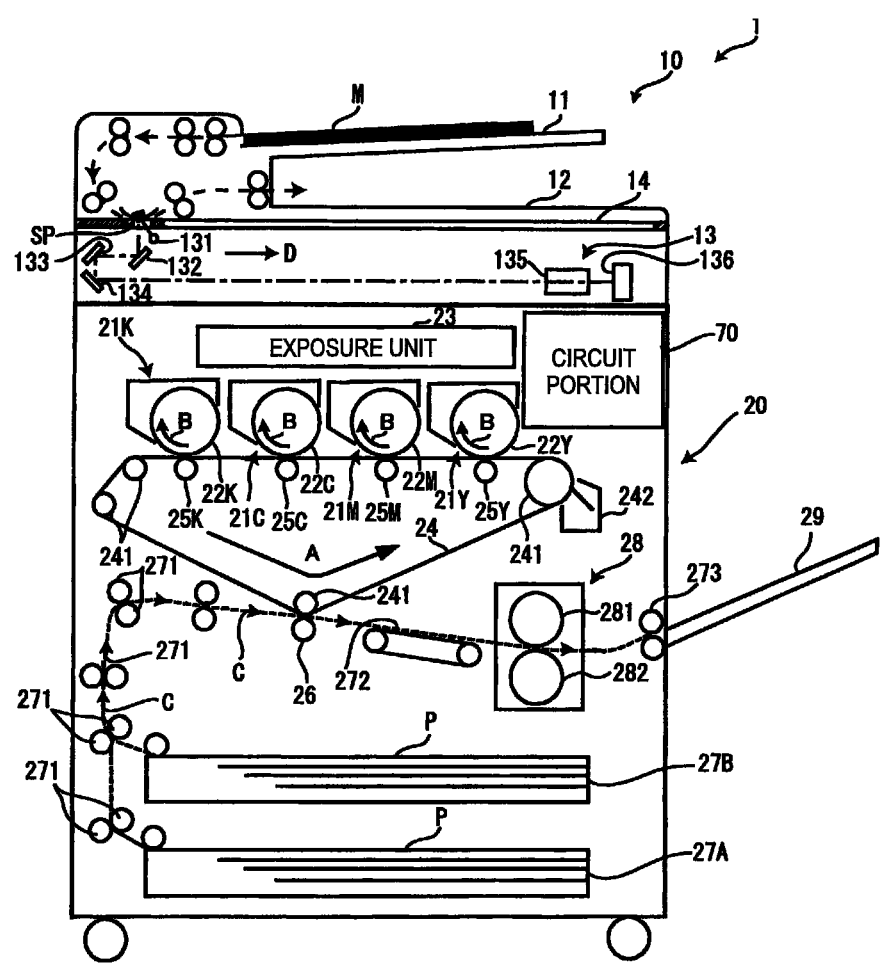
FIG. 2 is a schematic view showing mainly the mechanical structure of the multifunction apparatus shown in the block diagram of FIG. 1.
Figure 3:
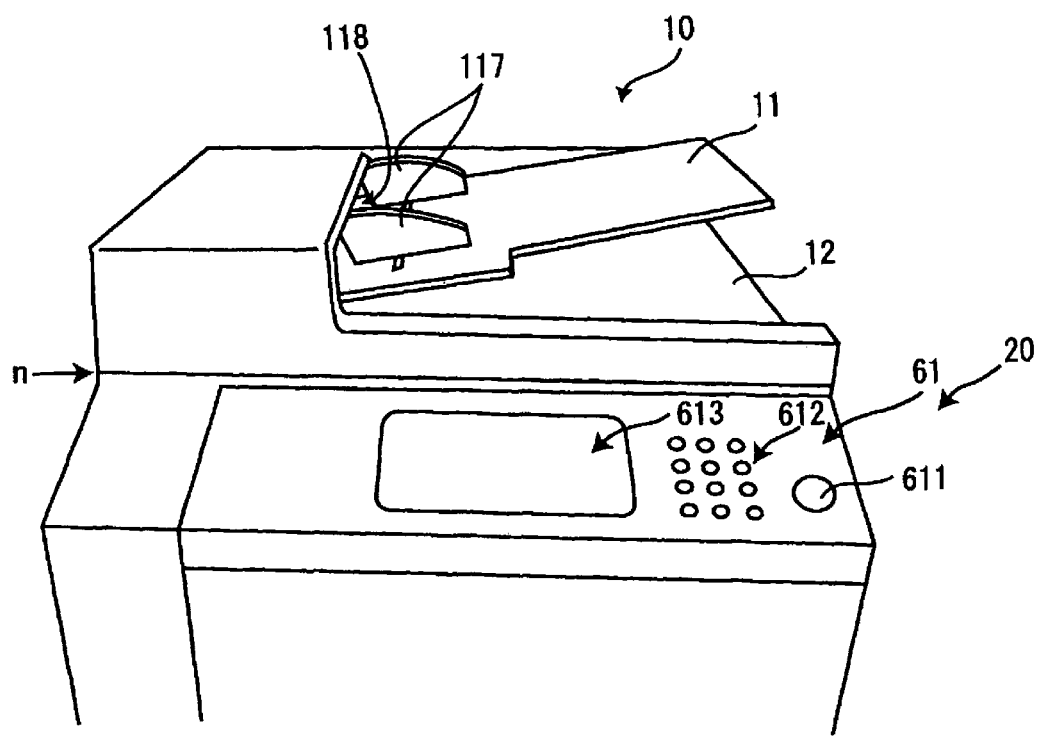
FIG. 3 is a perspective view showing the appearance of an upper part of the copier shown in FIG. 2.

The signal processor 30, the I/O interface 40, the FAX interface 50 and the controller 60 may be provided in the housing of the image reading device 10, may be provided in the housing of the image forming device 20 or may be provided so as to be divided between in the housing of the image reading device 10 and in the housing of the image forming device 20. In the multifunction apparatus 1 described herein, they are provided in the housing of the image forming device 20 as shown in FIG. 2. However, the user interface 61 is provided, as shown in FIG. 3, on the upper surface of the housing of the image forming device 20.

FIG. 2 is a schematic view showing mainly the mechanical structure of the multifunction apparatus shown in the block diagram of FIG. 1.

In this FIG. 2, the structures of the image reading device 10 and the image forming device 20 of the multifunction apparatus 1 also shown in FIG. 1 are shown. The other elements (the signal processor 30, the I/O interface 40, the FAX interface 50, and the controller 60) shown in FIG. 1 are denoted as a circuit portion 70, and are collectively shown as one block. However, the user interface 61 will be separately described with reference to FIG. 3. The image reading device 10 has a conveyance reading mode and a stationary reading mode as reading modes for reading an image on a document.

In the conveyance reading mode, a document M placed on a document tray 11 is conveyed sheet by sheet on a conveyance path shown by the broken line with a user operation (depression of a start button 611 shown in FIG. 3) as a trigger, and passes a reading position SP. The image recorded on the document is illuminated by a lamp 131 when passing this reading position SP, and the reflected light is directed to a reading sensor 136 by way of reflecting mirrors 132, 133 and 134 and a lens 135 constituting a reading optical system and is read by the reading sensor 136 to generate an image signal. In the present exemplary embodiment, a light receiving device 13 is formed of the reading optical system constituted by the reflecting mirrors 132, 133 and 134 and the lens 135 and the reading sensor 136. The document M having passed the reading position SP is ejected onto a document ejection tray 12. Details of the conveyer that performs the conveyance of this document M will be described later.

Moreover, this image reading device 10 is provided with transparent glass 14 where one sheet of document is placed. Moreover, this image reading device 10 is provided with a hinge extending right and left on the back side in the direction vertical to the plane of FIG. 2, and is structured so that the front side is lifted so as to open the top of the transparent glass 14.

In the stationary reading mode, this is lifted, one sheet of document M is placed upside down on the transparent glass 14, and the document is sandwiched between the transparent glass 14 and the lower surface of the document ejection tray 12. When this is done and reading is started by a user operation, the lamp 131 and the mirrors 132 to 134 move in the direction of the arrow D along the lower surface of the transparent glass 14, the image on the document is read by the reading sensor 136, and an image signal is generated.

Next, the outline of the image forming device 20 will be described.

This image forming device 20 is a device of a type that forms an image on the sheet P by the so-called electrophotographic method.

This image forming device 20 is provided with image forming units 21K, 21C, 21M and 21Y that form toner images by using toners of colors of black (K), cyan (C), magenta (M) and yellow (Y), respectively.

Hereinafter, when it is unnecessary to distinguish among the colors, the indices K, C, M and Y representative of the colors are omitted, and the reference designation of only the numeral is cited in the description.

The image forming units 21 are each provided with an electrophotographic photoreceptor 22 that rotates in the direction of the arrow B. The photoreceptors 22 are each charged by a non-illustrated charger and receive exposure light irradiation from an exposure unit 23 so that an electrostatic latent image is formed on each photoreceptor 22. This electrostatic latent image is developed with toner by a non-illustrated developer unit so that a toner image of each color is formed on each photoreceptor 22.

Moreover, below the image forming units 21, an intermediate transfer belt 24 is provided that is disposed along the array of the photoreceptors 22 and stretched around rolls 241 to circulatively move in the direction of the arrow A. In positions opposed to the photoreceptors 22 with this intermediate transfer belt 24 in between, primary transfer rolls 25 are disposed.

The toner images of the colors formed on the photoreceptors 22 are successively transferred onto the intermediate transfer belt 24 so as to overlap one another by the action of the primary transfer rolls 25.

The image forming units 21 are each provided with a non-illustrated cleaner that cleans the area of the photoreceptor 22 having undergone the transfer, and the photoreceptors 22 have the surfaces thereof cleaned by the cleaners.

Moreover, this image forming device 20 is provided with a secondary transfer roll 26, and onto the sheet P conveyed to this position, toner images successively transferred so as to overlap one another on the intermediate transfer belt 24 are transferred.

In a lower part of this image forming device 20, a first tray 27A and a second tray 27B accommodating sheets are provided. In the toner image transfer onto the sheet P, one sheet P is taken out from either of the sheet trays 27A and 27B, conveyed in the direction of the arrow C by conveyance rolls 271, and undergoes transfer of the toner image on the intermediate transfer belt 24 when passing the position of the secondary transfer roll 26. The sheet P having undergone the toner image transfer is further conveyed by a conveyance belt 272 to pass a fixing unit 28. This fixing unit 28 is provided with a heating roll 281 and a pressurizing roll 282, and the conveyed sheet P carrying an unfixed toner image is sandwiched between the heating roll 281 and the pressurizing roll 282 to be heated and pressurized, whereby the unfixed toner image on the sheet P is fixed onto the sheet P. The sheet P where the image formed of the fixed toner image is printed is ejected onto an ejection tray 29 by ejection rolls 273.

After the toner image on the intermediate transfer belt 24 is transferred onto the sheet P by the action of the secondary transfer roll 26, the intermediate transfer belt 24 has the surface thereof cleaned by a cleaner 242.

FIG. 3 is a perspective view showing the appearance of an upper part of the copier shown in FIG. 2.

In this figure, the image reading device 10 and the appearance of an upper part of the image forming device 20 are shown.

In the image reading device 10 shown in this FIG. 3, the document tray 11 and the document ejection tray 12 also shown in FIG. 2 are shown. Moreover, in this figure, guide members 117 are also shown that guide the conveyed document while limiting the position in the direction of the width of the document placed on the document tray 11. The document placed on the document tray 11 has its position in the direction of the width limited by the guide members 117, and upon depression of the start button 611 described later, when reading conditions are met, the document is successively conveyed in sheet by sheet from a document conveyance opening 118 while being guided by the guide members 117. The document reading conditions will be described later.

Figure 5:
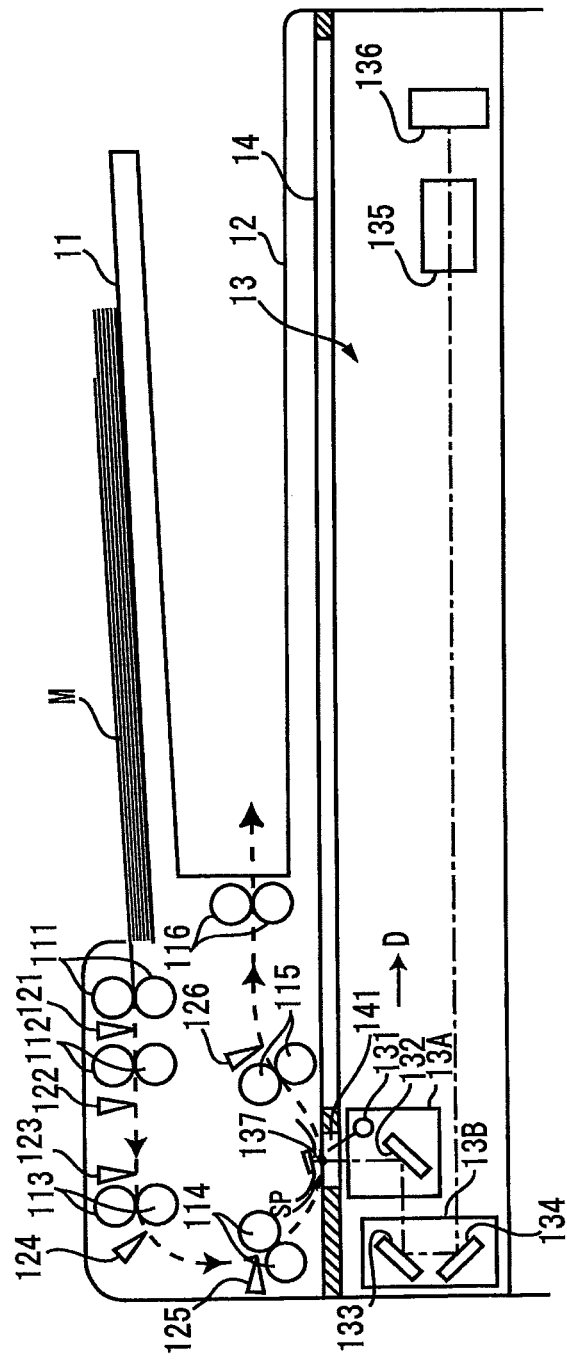
FIG. 5 is an operation explanation view of the image reading device shown in FIG. 1 and FIG. 2.

As described above, this image reading device 10 has a structure in which the part above the line n shown in this FIG. 3 is lifted up with the back side as a hinge, a document is placed upside down on the transparent glass 14 therebelow (see FIG. 2) under the lifted condition, the lifted upper part is again closed as shown in FIG. 5 and the start button 611 is depressed. Then, in this image reading device 10, reading of the image on the document in the above-described stationary reading mode is performed.

Moreover, on the upper part of the image forming device 20 shown in this FIG. 3, the user interface 61 (refer also to FIG. 1) is shown.

The user interface 61 shown in this FIG. 3 has the above-mentioned start button 611, a plurality of setting buttons 612 including a numerical key board, and a touch panel 613 serving also as a display.

When the start button 611 is depressed, document reading at the image reading device 10 is started. Moreover, with the setting buttons 612, the number of copies, the receiver's FAX number at the time of FAX transmission and the like are set.

Further, on the touch panel 613, various settings are made according to the screen displayed thereon.

Figure 4:
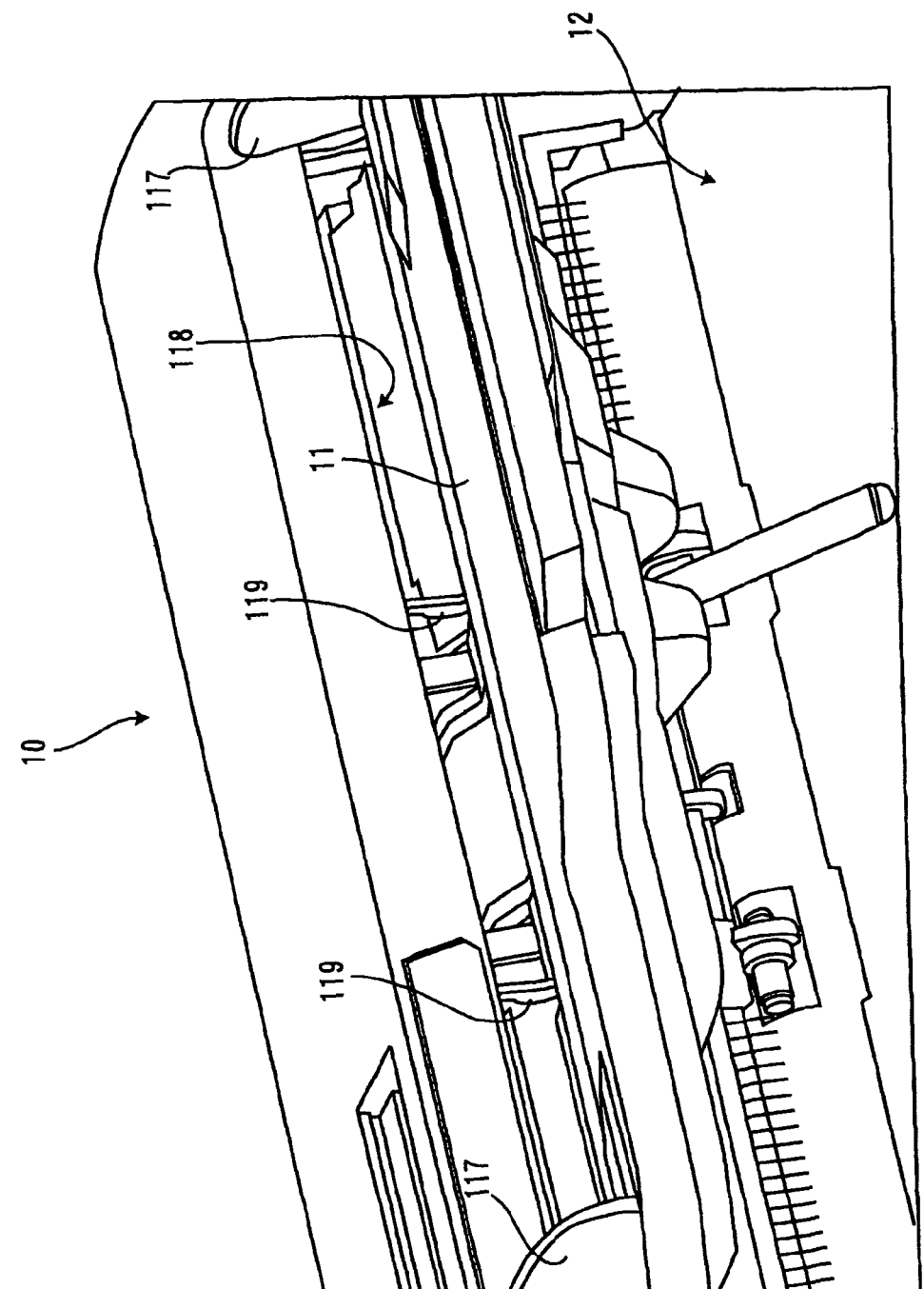
FIG. 4 is a perspective view showing the condition where a document conveyance opening is viewed from the document tray side.

FIG. 4 is a perspective view showing the condition where the document conveyance opening is viewed from the document tray side.

At the entrance of the document conveyance opening 118, set sensors 119 are provided in two positions in the direction of the width of the document. These set sensors 119 are sensors that fall upward by being pushed by the front edge of a document when the document is placed in a position suitable for document conveyance on the document tray 11 and detect that they have fallen upward.

When a document is placed in the correct position on the document tray 11 in a correct posture without any large inclination, the front edge of the document is detected by both of these two set sensors 119. On the other hand, when the front edge of a document is detected by only one set sensor 119 of these two set sensors 119, this indicates that the document is placed in an inclined posture on the document tray 11 although it is possible to convey the document. Further, when none of these two set sensors 119 detects the front edge of a document, it indicates that no document is placed on the document tray 11 or that a document is not placed in a document conveyance possible condition. In the present exemplary embodiment, the operation is executed according to the condition of detection of the front edge of the document by these two set sensors 119. Details will be described later.

FIG. 5 is an operation explanation view of the image reading device shown in FIG. 1 and FIG. 2.

The document M placed on the document tray 11 is conveyed sheet by sheet on the conveyance path passing the reading position SP, and ejected onto the document ejection tray 12.

As conveyance members that perform the conveyance of this document M, in FIG. 5, first rolls 111, second rolls 112, third rolls 113, fourth rolls 114, fifth rolls 115 and sixth rolls 116 are shown. Moreover, as sensors that detect the presence or absence of a document being conveyed on this conveyance path, a first sensor 121, a second sensor 122, a third sensor 123, a fourth sensor 124, a fifth sensor 125 and a sixth sensor 126 are shown.

This conveyance path is provided with the function of correcting the inclination of the document M. However, since a loud noise is caused when this document inclination correction function is used compared with when it is not used, in this image reading device 10, whether to use this document inclination correction function or not can be selected. In this example, a mode using this document inclination correction function is called a first correction mode, and a mode not using this document inclination correction function is called a second correction mode. In this example, assuming that the device is in the first correction mode using the document inclination correction function, the document inclination correction function will be described.

The first rolls 111 are rolls having a role in sending out one sheet of a plurality of sheets of document M placed on the document tray 11 onto this conveyance path. At the point of time when the front edge of the document M sent out by the first rolls 111 reaches the second rolls 112, the second rolls 112 are not rotating yet but are stationary, and consequently, the front edge of the sent out document M butts against the second rolls 112 to be curved, whereby the inclination is corrected when the document is sent out in a condition of inclining right and left. Thereafter, the second rolls 112 also rotate to further convey the document M, and this document M further butts against the third rolls 113 to be curved again, whereby the inclination of the document is corrected again; Thereafter, the document M is further sent out by the third rolls 113, and is conveyed in a condition where a slight curve is still left between the second rolls 112 and the third rolls 113 in order that the document M is not pulled by the speed difference between the second rolls 112 and the third rolls 113. The document conveyed by the third rolls 113 is further conveyed by the fourth rolls 114 to pass the reading position SP. At this reading position SP, the document M is conveyed in a condition of being in contact with the upper surface of a transparent glass plate 141. The document M having passed the reading position SP is further conveyed by the fifth rolls 115, and ejected onto the document ejection tray 12 by the sixth rolls 116.

At the first sensor 121 to the sixth sensor 126, the passage, of the position where each sensor is disposed, of the sent out document M is detected, whereby the timing of the start of rotation of the rolls and the start of reading by the reading sensor 136 and the like are adjusted. Regarding the timing of the start of reading by the reading sensor 136, when image inclination correction processing on the image signal (described later with reference to FIGS. 6A to 6D) is performed, the adjustment of the reading start timing is particularly strict, and compared with a case where the document inclination correction processing described with reference to this FIG. 5 is executed and the image inclination processing is not performed on the image signal, precise timing adjustment is performed.

Here, a reflecting member 137 is provided on the back side of the document M passing the reading position SP, that is, in a position where the document M at the reading position is sandwiched between the reflecting member 137 and the lamp 131.

When the document M passes the reading position SP, the light emitted from the lamp 131 illuminates the document M, the reflected light is incident on the light receiving device 13 and is read by the reading sensor 136 to generate an image signal. The light receiving device 13 in the present exemplary embodiment is provided with the mirrors 132 to 134, the lens 135 and the reading sensor 136.

The lamp 131 and the first mirror 132 are incorporated in a first carriage 13A, and the second mirror 133 and the third mirror 134 are incorporated in a second carriage 13B.

Here, in the conveyance reading mode, that is, in a mode where the document M is placed on the document tray 11 and the document M is sent out by the first rolls 111, conveyed and read at the reading position SP, under a condition where the first carriage 13A and the second carriage 13B are stationary at the stationary positions shown in FIG. 4 and FIG. 5, the document M conveyed to the reading position SP is illuminated by the lamp 131 and the reflected light is read by the reading sensor 136. On the other hand, in the stationary reading mode, the document is placed upside down on the transparent glass 14, the first carriage 13A and the second carriage 13B move in a sub scanning direction, that is, in the direction of the arrow D along the lower surface of the transparent glass 14. At this time, the second carriage 13B moves at a speed ½ the movement speed of the first carriage 13A. Thereby, the optical path length, to the lens 135, of the reflected light reflected at the document placed on the transparent glass 14 is maintained fixed, so that the image on the document is correctly imaged on the reading sensor 136.

Next, the second correction mode in the present exemplary embodiment will be described.

In the present exemplary embodiment, the image inclination correction processing is performed in the second correction mode. This image inclination correction processing is processing where based on an image signal obtained by document reading, the amount of inclination of the image represented by the image signal is calculated and based on the calculated inclination amount, a new image signal representative of the inclination-corrected image is generated.

The image signal obtained by reading the document at the image reading device 10 includes the border line between the document itself and the background outside the document (the reflecting member 137), that is, information on the end edges of the document in addition to the image recorded on the document. In this example, first, the front end edge, in the conveyance direction, of the document is detected based on the information on the end edges of the document included in the inputted image signal. When the front end edge is detected, then, the inclination amount of the document is calculated. Further, when the inclination amount of the document is calculated, then, the inclination of the image represented by the image signal is corrected to generate a new image signal representative of the inclination-corrected image.

FIGS. 6A to 6D are explanatory views of the processing contents of the image inclination correction processing.

In this example, first, the straight line representative of the front end edge of the document and the inclination angle of the straight line are calculated by Hough transform. Then, the image on the document is rotated by an amount corresponding to the inclination amount on the image signal by rotation processing included in affine transform to generate a new image signal representative of an image with no inclination.

The Hough transform and the affine transform are widely known calculation methods, and only an outline is described herein.

Figure 6A:
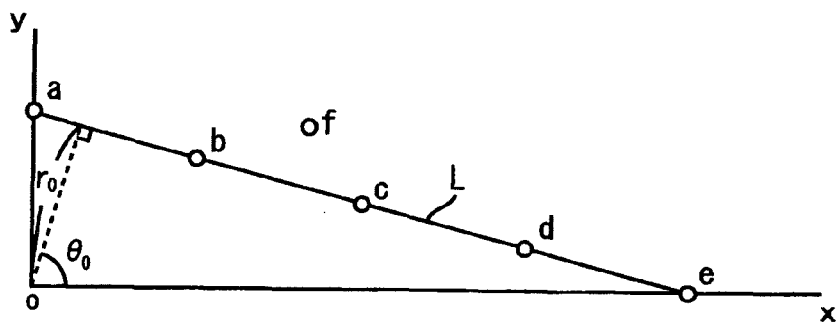
FIGS. 6A, 6B, 6C and 6D are explanatory views of the processing contents of image inclination correction processing.
Figure 6B:
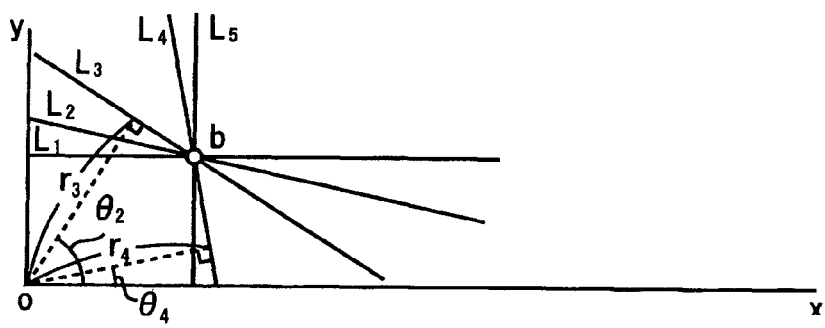
Figure 6C:
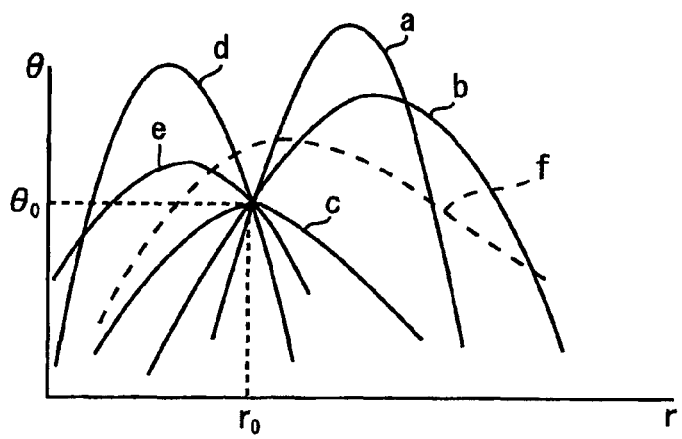

FIGS. 6A to 6C are explanatory views of the Hough transform.

As described above, the document is conveyed on the conveyance path passing the reading position, and while the document is passing the reading position, the image on the document is read and an image signal is generated. This image signal includes the information on the end edges of the document itself.

The horizontal axis x of FIG. 6A represents the position of the document in the width direction, and the vertical axis y represents the conveyance direction of the document.

The straight line L shown in FIG. 6A is a straight line representative of the front end edge of the document, obtained as the image signal. However, this straight line is still unknown, and in this example, it is assumed that points a to f considered to be present on the front end edge of the document are extracted from the obtained image signal. Although among these points a to f, points (the points a to e in this example) on the straight line L representative of the front end edge of the document are present in a large number, an error point (represented by the point f in this description) is also present.

When the length of the perpendicular drawn down from the origin O to the straight line is r and the inclination is θ, the straight line is expressed as $$r = x \cos\theta + y \sin\theta \quad (1)$$

and when $$r = r_0, \theta = \theta_0 \quad (2)$$

is determined as shown in FIG. 6A, the straight line L shown in FIG. 6A is univocally determined.

The Hough transform is a calculation method to obtain $(r, \theta) = (r_0, \theta_0)$.

FIG. 6B is a view where taking only one point b of FIG. 6A, various straight lines (represented by five straight lines $L_1$ to $L_5$ in this example) passing the point b are shown.

Perpendiculars are drawn down from the origin O to the straight lines $L_1$ to $L_5$, and the lengths of the perpendiculars are designated $r_i$ and the angles thereof are designated $\theta_i$ (i=1, ..., 5). In FIG. 6B, lengths $r_3$ and $r_4$ and angles $\theta_3$ and $\theta_4$ are shown with respect to two straight lines $L_3$ and $L_4$.

FIG. 6C is a view representing a Hough space formed of the length r (horizontal axis) and the angle θ (vertical axis).

When the lengths r and the angles θ of the perpendiculars with respect to a number of straight lines passing the point b shown in FIG. 6B are plotted, the sinusoidal curve shown as a graph b in FIG. 6C is obtained. The curved line of this graph b represents the straight lines passing the point b.

When graphs formed of the lengths r and the angles θ of the perpendiculars are similarly obtained with respect to all the points a to f as well as with respect to the point b shown in FIG. 6A, graphs a to f shown in FIG. 6C are obtained.

Here, the points correctly situated on the front end edge of the document (the points a to e in this example) pass a point $(r_0, \theta_0)$ in the Hough space shown in FIG. 6C; on the contrary, the graph f representative of the straight lines passing the error point (the point f in this example) is a curved line not passing the point $(r_0, \theta_0)$.

As described above, on the image signal, points considered to be points on the front end edge of the document are extracted in a large number, graphs as in FIG. 6C are calculated in a large number, and the point where the large number of graphs converge to one point is found, whereby $(r_0, \theta_0)$ to identify the straight line L shown in FIG. 6A can be obtained.

In this example, the straight line L representative of the front end edge of the document is recognized by the above-described Hough transform based on the image signal.

Figure 6D:
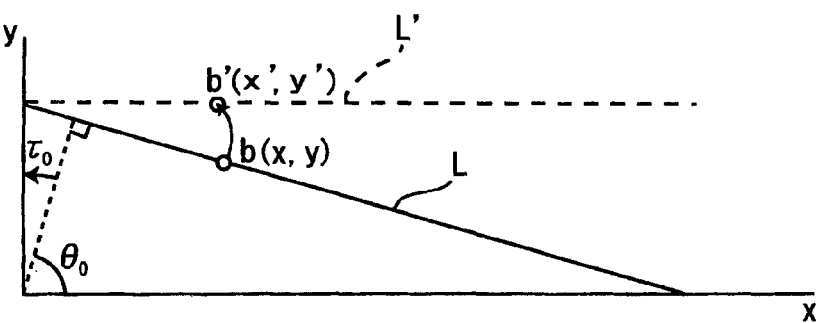

The straight line L representative of the front end edge of the document is also shown in FIG. 6D.

In this stage, this straight line L has already been univocally determined by the Hough transform described with reference to FIGS. 6A to 6C. That is, the angle θ0 has been determined.

In this example, using this angle $\theta_0$, the inclination angle $\tau_0$ of the straight line L, that is, the inclination amount of the document is calculated by a calculation of $$\tau_0 = 90° - \theta_0 \quad (3)$$

Further, the processing of calculating a straight line L' with no inclination by rotating the straight line L is performed.

That is, when the coordinates of a point (represented by the point b in this example) on the straight line L is (x, y), a new coordinate (x', y') obtained by rotating the point b by the angle $\tau_0$ is $$x' = x \cos\tau_0 - y \sin\tau_0$$

$$y' = x \sin\tau_0 + y \cos\tau_0 \quad (4).$$

In this example, the coordinates of all the pixels constituting the image represented by the image signal are transformed according to the expression (4) shown above. By doing this, the image signal representative of an inclined image which signal is obtained by the document being read in an inclined condition is transformed into a new image signal representative of the image when it is read under a condition where there is no document inclination.

In the present exemplary embodiment, the above-described image inclination correction processing and the document inclination correction operation described with reference to FIG. 5 are alternatively executed according to the operation mode.

Next, the image reading operation in the present exemplary embodiment will be described.

In this example, description will be given bearing in mind the copy mode where a document is read by the image reading device 10 and a copy image based on the image signal obtained by the reading is formed by the image forming device 20.

Figure 7:
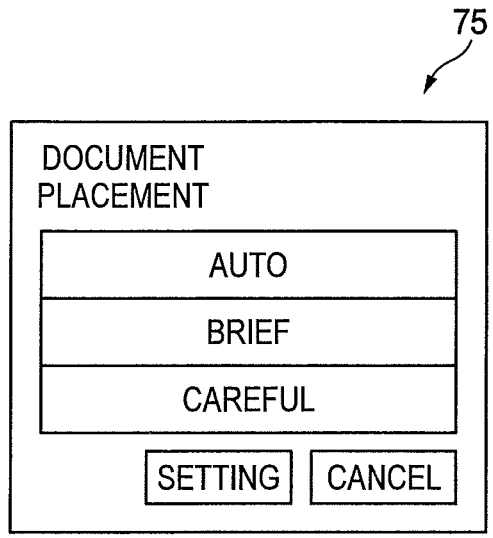
FIG. 7 is a view showing a document placement setting screen.

FIG. 7 is a view showing a document placement setting screen.

This document placement setting screen 75 is a screen displayed on the touch panel 613 included in the user interface 61 (see FIG. 3) at the time of the initial setting operation of the user interface 61 by the user.

On this document placement setting screen 75, push buttons "auto", "brief" and "careful" are aligned. Further, a "setting" button and a "cancel" button are also displayed hereon. In this example, description of the "auto" will be given later, and the push buttons of "brief" and "careful" will be described first.

As described with reference to FIG. 4, at the entrance of the document conveyance opening 118, the set sensors 119 are provided in two positions in the direction of the width of the document. In the above-described conveyance reading mode, by depressing the start button 611 with a document placed on the document tray 11 (see FIG. 3), the document is conveyed in from the document conveyance opening 118, and the image on the document is read at the reading position SP shown in FIG. 5.

The "brief" on the document placement setting screen 75 shown in FIG. 7 is a push button to set the start of document conveyance and reading if either one set sensor 119 of the two set sensors 119 is on (the front edge of the document is detected) when the start button 611 is depressed. Moreover, the "careful" is a push button to set the start of document conveyance and reading only when both of the two set sensors 119 are on when the start button 611 is depressed. Moreover, the "auto" is a push button to set a mode of switching between starting or not starting document conveyance and reading according to a condition described with reference to FIG. 8 when the start button 611 is depressed. Alternatively, although according to the condition described with reference to FIG. 9, document conveyance and reading are started by depressing the start button 611 if one of the two set sensors 119 is on, the correction mode is switched according to whether only one of the set sensors 119 is on or the two are both on. Details will be provided in the description of FIG. 8.

When any of the push buttons "auto", "brief" and "careful" on the document placement setting screen 75 shown in this FIG. 7 is depressed and the "setting" button is further depressed, any of the "auto", the "brief" and the "careful" is set according to the depressed push button, and this document placement setting screen 75 disappears from the touch panel 613. When the "cancel" button is depressed, this document placement setting screen 75 disappears from the touch panel 613 without any new setting being made. However, the "setting" referred to here indicates "storage" into a storage portion provided in the circuit portion 70 shown in FIG. 2. The preparation for the operation based on the storage contents is performed separately. Details will be described later.

Figure 8:
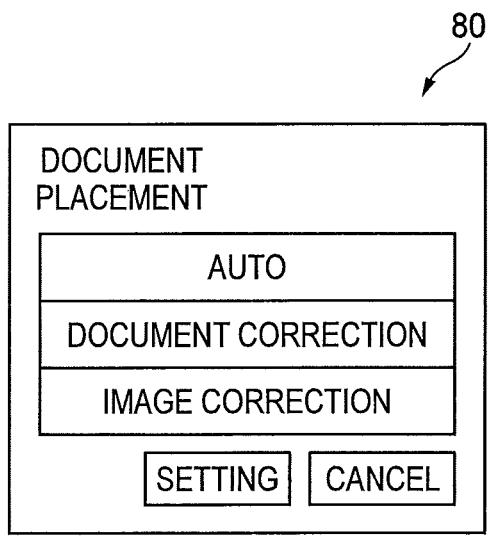
FIG. 8 is a view showing a correction switching setting screen.

FIG. 8 is a view showing a correction switching setting screen. Like the document placement setting screen 75, this correction switching setting screen 80 is a screen displayed on the touch panel 613 at the time of an initial setting operation by the user.

On this correction switching setting screen 80, push buttons "auto", "document correction" and "image correction" are aligned. Further on this screen, a "setting" button and a "cancel" button are also displayed. In this example, description of the "auto" will also be given later, and the "document correction" and the "image correction" will be described first. The "document correction" is a push button to set the first correction mode to correct the inclination of the conveyed document which mode has been described with reference to FIG. 5. Moreover, the "image correction" is a push button to set the second correction mode to correct the inclination of the image based on the image signal obtained by document reading which mode has been described with reference to FIGS. 6A to 6D. The "auto" is a push button to set automatic switching between the first correction mode and the second correction mode according to a condition described later.

When a push button of the "auto", the "document correction" and the "image correction" is depressed on the correction switching setting screen 80 shown in this FIG. 8 and the "setting" button is further depressed, any of the "auto", the "document correction" and the "image correction" is set according to the depressed push button, and this correction switching setting screen 80 disappears from the touch panel 613. When the "cancel" button is depressed, this correction switching setting screen 80 disappears from the touch panel 613 without any new setting being made. However, the "setting" referred to here also indicates "storage" like the setting by the operation of the document placement setting screen 75 shown in FIG. 7.

Here, the settings of the document placement and the correction switching shown in FIG. 7 and FIG. 8 are initial settings, and once set, they are effective until the next re-setting even if the job is repeated any number of times.

Figure 9:
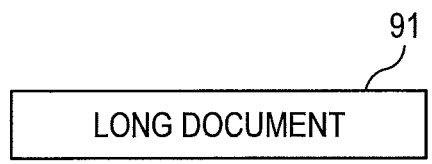
FIG. 9 is a view showing a long document setting button.

FIG. 9 is a view showing a long document setting button.

In the present exemplary embodiment, when a document whose length in the conveyance direction is not less than a predetermined length (as an example, 440 mm) is placed on the document tray 11 and the document is read, the setting of a long mode is made. This long mode setting is made by depressing the long document setting button 91 shown in FIG. 9 which button 91 is displayed on the touch panel 613. Unlike the settings of the document placement and the correction switching shown in FIG. 7 and FIG. 8, this long mode setting is made at each reading job prior to the reading. When the document reading of the job is finished, the setting of being in the long mode is canceled to return to the mode to read a normal size document shorter than the long document.

While in this example, it is described that for the setting of the long mode, the long document setting button 91 shown in FIG. 9, displayed on the touch panel 613 is depressed, the long document setting button may be provided as one of the setting buttons 612 on the user interface 61 shown in FIG. 3. Alternatively, a sensor detecting that a long document is placed on the document tray 11 may be provided to spare the user the trouble of making setting.

Moreover, in causing this multifunction apparatus 1 to perform the copy operation of reading a document and forming a copy image, the number of copies (the number of formed copy images per document) is set by the setting buttons 612 shown in FIG. 3 at each job prior to the execution of the job.

Figure 10:
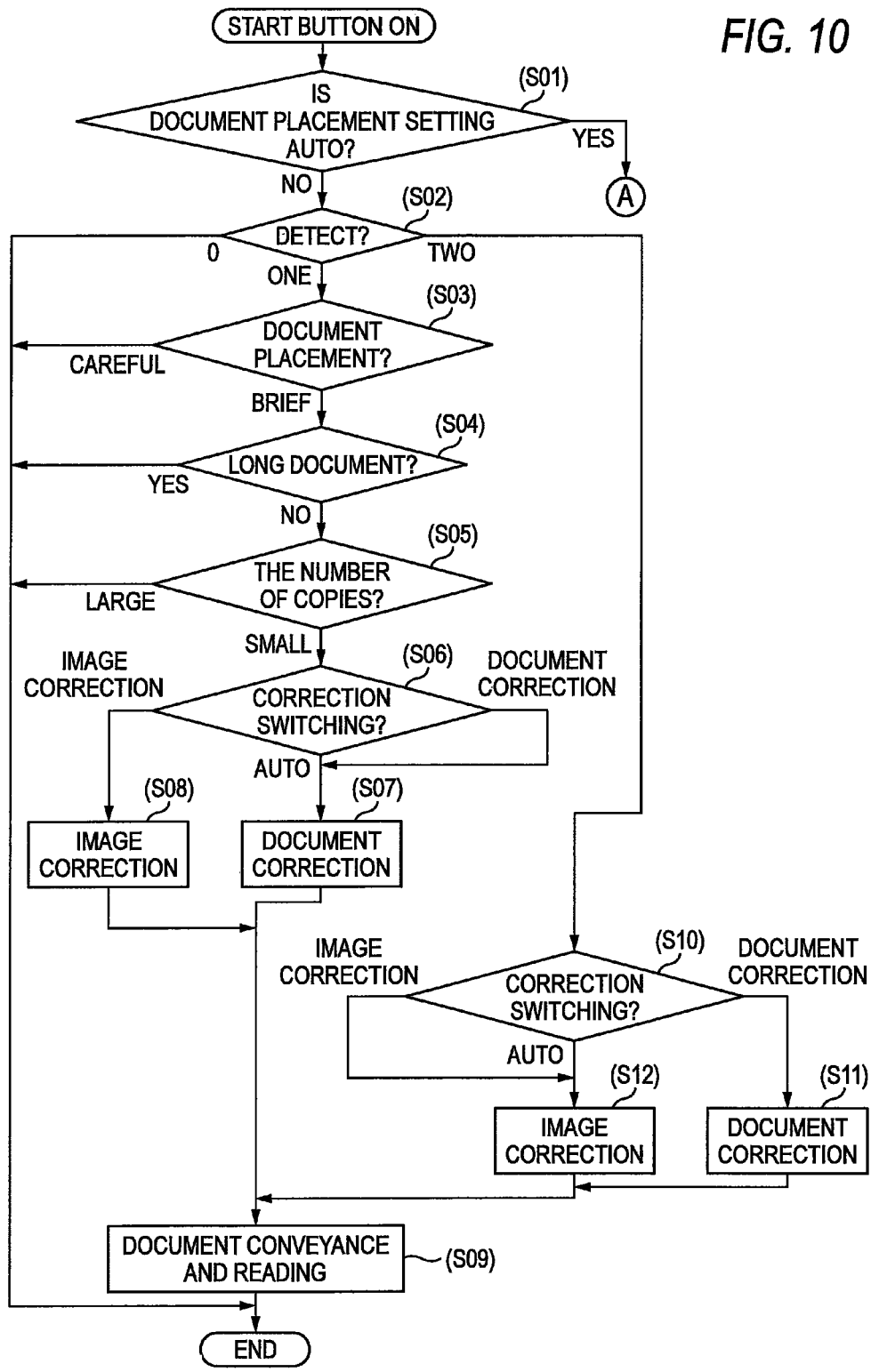
FIG. 10 is a flowchart showing an operation sequence when a start button is depressed in a copy mode.
Figure 11:
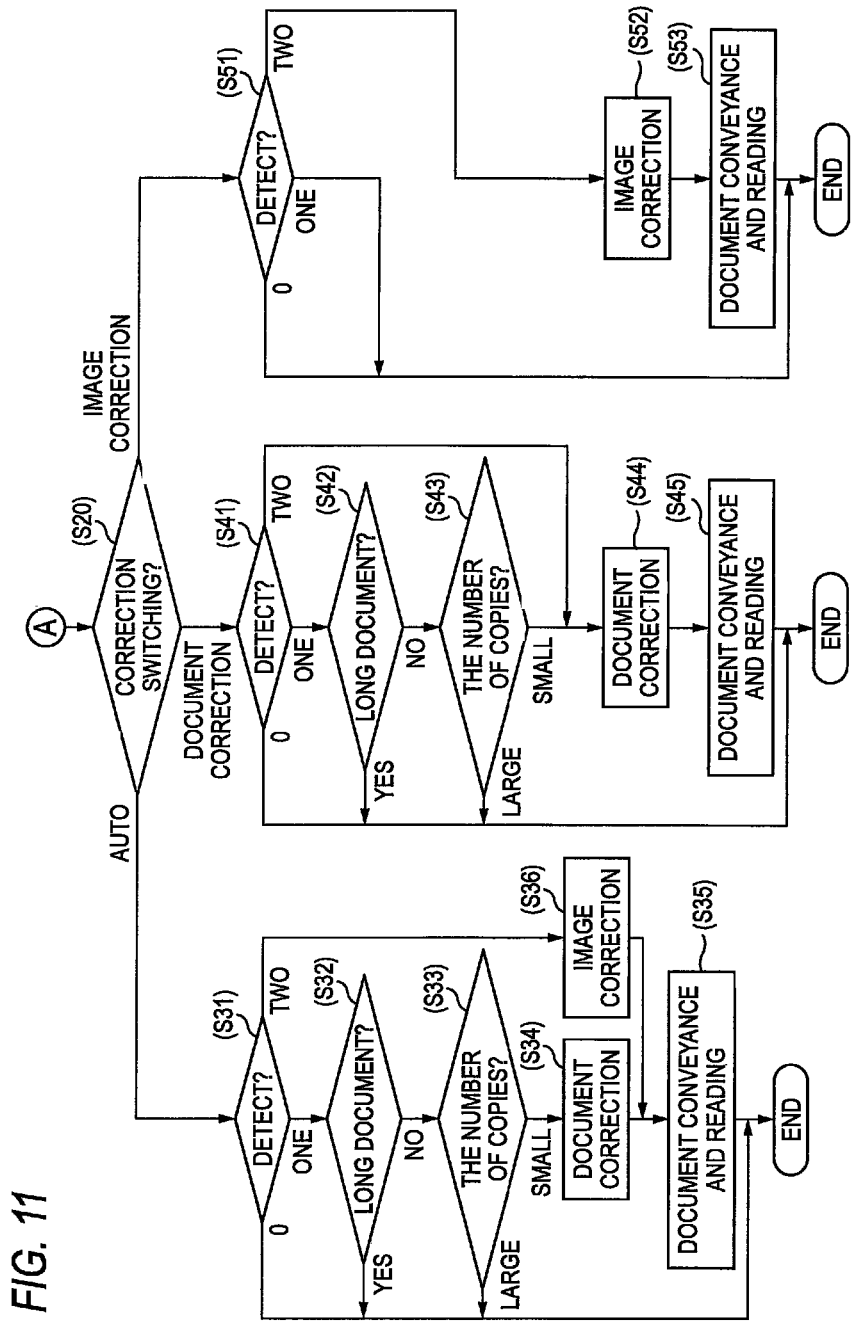
FIG. 11 is a flowchart showing an operation sequence when the start button is depressed in the copy mode.

FIG. 10 and FIG. 11 are flowcharts showing operation sequences when the start button is depressed in the copy mode.

When a document is placed on the document tray 11 and the start button 611 shown in FIG. 3 is depressed, the execution of the operation sequence shown in FIG. 10 is started. In this example, first, whether the document placement setting (see FIG. 7) is the "auto" or not is determined (step S01). When the document placement setting is the "auto", the process proceeds to the operation sequence shown in FIG. 11. FIG. 11 will be described later. When the document placement setting is not the "auto", that is, when it is the "brief" or the "careful", the process proceeds to step S02. At this step S02, whether one or both of the two set sensors 119 (see FIG. 4) are on or not is determined. In the case of zero, that is, when none of the two set sensors 119 detect a document, the process ends under that condition without the operation of document conveyance and reading being performed.

When document conveyance and reading are not performed although the start button 611 is depressed, the occurrence of an error may be indicated on the touch panel 613.

When either one set sensor of the two set sensors 119 is on, the process proceeds to step S03. At this step S03, whether the document placement setting (see FIG. 7) is the "brief" or the "careful" is determined. When it is determined at step S03 that the document placement setting is the "brief", the process proceeds to step S04, and whether the document to be read this time is a long document or not is determined. In this example, when only one of the two set sensors 119 is on (step S02), even if the document placement setting is the "brief" (step S03), the depression of the start button 611 is ineffective for the long document, and document conveyance and reading are not started. As described above, the "brief" indicates that document conveyance and reading are performed if at least one set sensor of the two set sensors 119 is on. However, in the case of a long document, if the long document is placed in an inclined posture on the document tray 11 and is conveyed and read with the inclined posture maintained, a situation where the inclination cannot be sufficiently corrected is expected. Therefore, in the exemplary embodiment, even if the "brief" is set, conveyance and reading are inhibited for long documents when only one set sensor of the two set sensors 119 is on.

When it is determined at step S04 that the current job is not a long document, then, whether the number of copies of the current job is large or small is determined. In this example, when the number of copies is not less than a predetermined number, document conveyance and reading are not performed. This indicates that the document is obliquely placed on the document tray 11 when only one set sensor of the two set sensors 119 is on (step S02). If document conveyance and reading are performed with this posture maintained, when the document is largely inclined, for example, a copy image where an image is partly missing can be formed. Although the user is responsible for the occurrence of such a copy image because the "brief" is set by the user, it is undesirable that a large number of defective images occur. Therefore, in the present exemplary embodiment, when the number of copies is not less than a predetermined threshold number, even if the "brief" is set (step S03), document conveyance and reading are inhibited under the condition where only one set sensor of the two set sensors 119 is on (step S02).

When it is determined at step S05 that the number of copies is less than the threshold number, then, it is determined which of the "auto", the "document correction" and the "image correction" the correction switching setting (see FIG. 8) is (step S06). As described above, the "document correction" indicates the first correction mode to correct the inclination of the document being conveyed, and the "image correction" indicates the second correction mode to correct the inclination of the image based on the image signal obtained by document reading. Therefore, in this example, the first correction mode or the second correction mode is set according to whether the correction switching setting is the "document correction" or the "image correction" (steps S07 and S08), and document conveyance and reading are started. The "setting" referred to here indicates a concrete preparation of the operation according to the correction mode. Here, when the correction switching setting is the "auto", the "document correction", that is, the first correction mode where noise at the time of document conveyance is large compared with the second correction mode is set. This is because if reading is performed with the document being inclined, a copy image where a corner of the image is missing can be obtained and this increases the possibility that the image inclination cannot be corrected based on the image signal or a partly missing image is obtained even if the inclination is corrected.

After this setting of the "document correction" or the "image correction", document conveyance and reading are performed (step S09). In this example, for one job, the conveyance and reading are successively performed to the last sheet of the document of the job with the set correction mode being maintained.

When it is determined at step S02 that the document is detected by both of the two set sensors 119, the process proceeds to step S10. At this step S10, as at step S06, it is determined which of the "auto", the "document correction" and the "image correction" the correction switching setting (see FIG. 8) is. When it is determined that it is the "document correction" or the "image correction", the first correction mode or the second correction is set, respectively (steps S11 and S12). However, at this step, unlike at step S06, when the correction switching setting is the "auto", the "image correction", that is, the second correction mode is set. In this example, it is determined at step S02 that the two set sensors 119 both detect the document. That is, the document is placed on the document tray 11 in a substantially correct posture without a large inclination. Therefore, when the correction switching setting is the "auto", the second correction mode where noise at the time of document conveyance is small compared with the first correction mode is selected. After the correction mode is set at steps S11 and S12, the process proceeds to step S09, and document conveyance and reading are performed.

Next, a first example (FIG. 10) of the operation sequence when it is determined at step S01 that the document placement setting (see FIG. 7) is the "auto" will be described.

In this case, subsequently to the determination of step S01, it is determined which of the "auto", the "document correction" and the "image correction" the correction switching setting (see FIG. 8) is (step S20).

When it is determined that the correction switching setting is the "auto", the process proceeds to step S31. At this step S31, how many set sensors of the two set sensors 119 are on is determined. When both of the two set sensors 119 are off, this operation sequence is ended. That is, the depression of the start button 611 is ineffective. When only one set sensor of the two set sensors 119 is on, then, whether the document is a long document or not (step S32) and whether the number of copies is not less than the threshold number or not (step S33) are determined. In this example, since only one set sensor 119 is on, when the document is a long document (step S32) and when the number of copies is large (step S33), document conveyance and reading are inhibited. When the document is not a long document and the number of copies is small, the "document correction", that is, the first correction mode is selected (step S34), and document conveyance and reading are started (step S35).

When it is determined at step S31 that the set sensors 119 are both on, including the case of a long document and the case where the number of copies is large, the "image correction", that is, the second correction mode is selected (step S36), and document conveyance and reading are performed.

When the document placement setting is the "auto" (step S01) and the correction switching setting is the "document correction", if at least one of the two set sensors 119 is on (step S41), excluding the case of a long document (step S42) and the case where the number of copies is large (step S43), the "document correction", that is, the first correction mode is selected (step S44), and document conveyance and reading are performed (step S45). When it is determined at step S41 that the set sensors 119 are both on, the process proceeds to step S44 irrespective of whether the document is a long document or not and whether the number of copies is large or not, and the "document correction", that is, the first correction mode is selected, and the document regarding the job is conveyed and read sheet by sheet (step S45).

When the document placement setting is the "auto" (step S01) and the correction switching setting is the "image correction" (step S20), only in a case where the set sensors 119 are both on (step S51), the depression of the start button 611 is effective. In this example, irrespective of whether the document is a long document or not and whether the number of copies is large or not, the "image correction", that is, the second correction mode is selected (step S52), and document conveyance and reading are performed (step S53).

Figure 12:
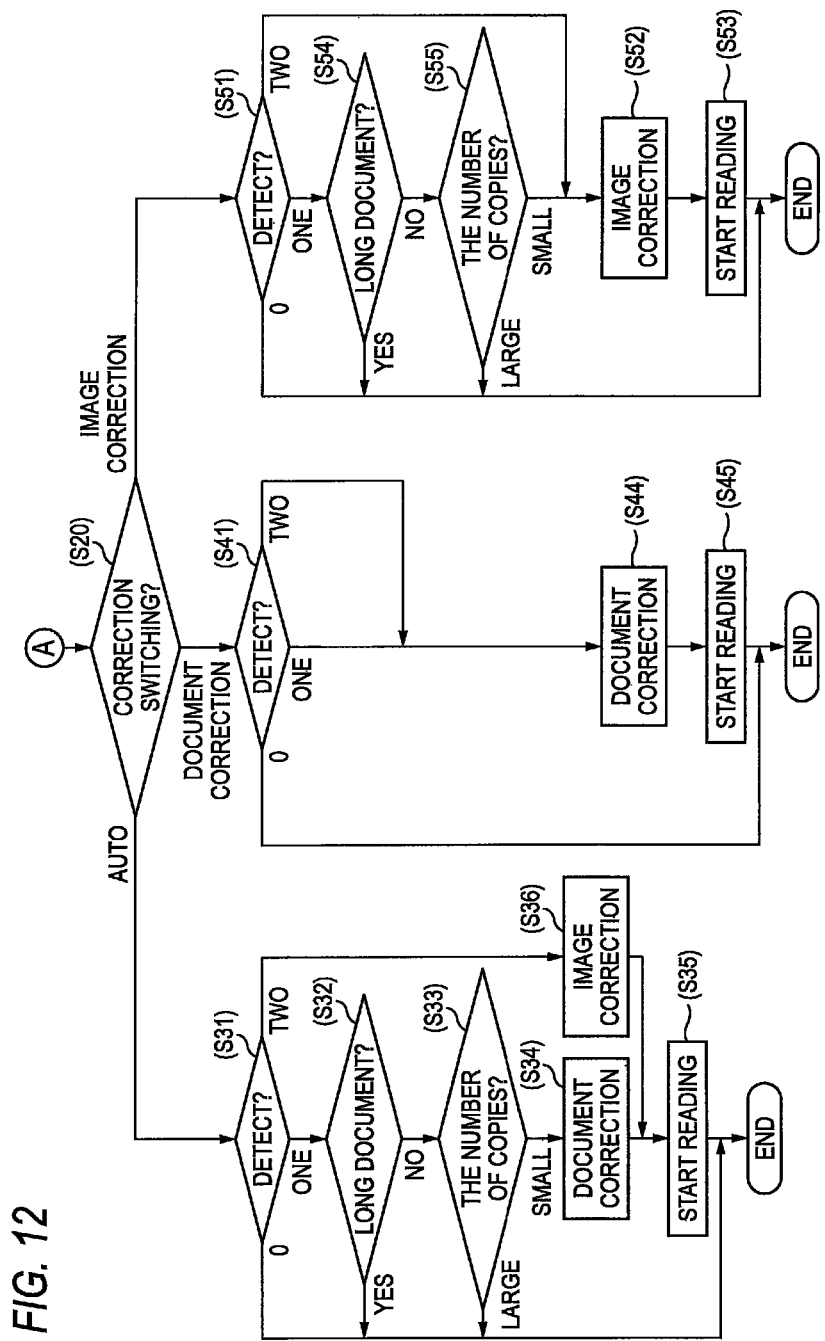
FIG. 12 is a flowchart showing a second example of the operation sequence executed instead of the operation sequence shown in FIG. 10 when a document placement setting (step S01) shown in FIG. 9 is "auto"

FIG. 12 is a flowchart showing a second example of the operation sequence executed instead of the operation sequence shown in FIG. 10 when the document placement setting (step S01) shown in FIG. 9 is the "auto". Steps the same as the steps of the operation sequence of the first example shown in FIG. 10 are denoted by the same reference numerals as the reference numerals assigned to the steps in FIG. 10, and descriptions thereof are omitted.

The operation sequence (steps S31 to 36) when the correction switching setting (step S20) is the "auto" is the same as that in the case of FIG. 10, and a description thereof is omitted.

When the correction switching setting (step S20) is the "document correction", the determination step as to whether the document is a long document or not (step S42) and the determination step as to whether the number of copies is large or not (step S43) shown in FIG. 10 are omitted. That is, in the case of the second example shown in this FIG. 11, when the correction switching setting (step S30) is the "document correction", even when only one set sensor 119 is on, the depression of the start button 611 is effective irrespective of whether the document is a long document or not and whether the number of copies is large or not, the "document correction", that is, the first correction mode is selected (step S44), and document conveyance and reading are performed (step S45). The first correction mode is, as described above, a mode in which the inclination of the document is physically corrected to return the document to the correct posture, and although noise at the time of conveyance is large compared with the second correction mode, correction of up to a larger inclination than in the second correction mode can be made. Therefore, in this second example, when the correction switching setting (step S20) is the "document correction", even when only one set sensor is on, the depression of the start button 611 is effective irrespective of whether the document is a long document or not and whether the number of copies is large or not.

When the correction switching setting (step S20) is the "image correction", compared with the case of FIG. 10, the step of the determination as to whether the document is a long document or not (step S54) and the step of the determination as to whether the number of copies is large or not (step S55) are added.

As described above, the "image correction", that is, the second correction mode cannot handle large inclinations compared with the first correction mode. Therefore, in this example, in the case of a large size document and when the number of copies is large, the depression of the start button when only one set sensor 119 is on is ineffective.

While the copy mode using both the image reading device 10 and the image forming device 20 has been described above, the present invention is capable of handling a facsimile transmission mode and a scanner mode not using the image forming device 20 and using only the image reading device 10. In that case, the steps of the determination as to whether the number of copies is large or small in FIG. 10 to FIG. 12 (steps S05, S33, S43 and S55) are omitted. Alternatively, an operation sequence may be adopted that is irrelevant to the number of copies and where the steps of the determination as to whether the number of copies is large or small are omitted even in the copy mode.

Moreover, while an example in which the long document reading mode is present is described in this exemplary embodiment, the present invention is also applied to an image reading device not performing long document reading and an image reading device disregarding whether the document is a long document or not. In this case, the setting of the long mode in FIG. 9 and the steps of the determination as to whether the document is a long document or not in FIG. 10 to FIG. 12 (steps S04, S32, S42 and S54) are omitted.

Moreover, while a multifunction apparatus including an example of the image reading device of the present invention and an example of the copier of the present invention is described in this exemplary embodiment, the present invention is also applicable to a single-function image reading device or copier.

Second Exemplary Embodiment

The descriptions of FIGS. 1 and 2 related to the first exemplary embodiment are also applied to the present exemplary embodiment. The descriptions are omitted here.

Figure 13:
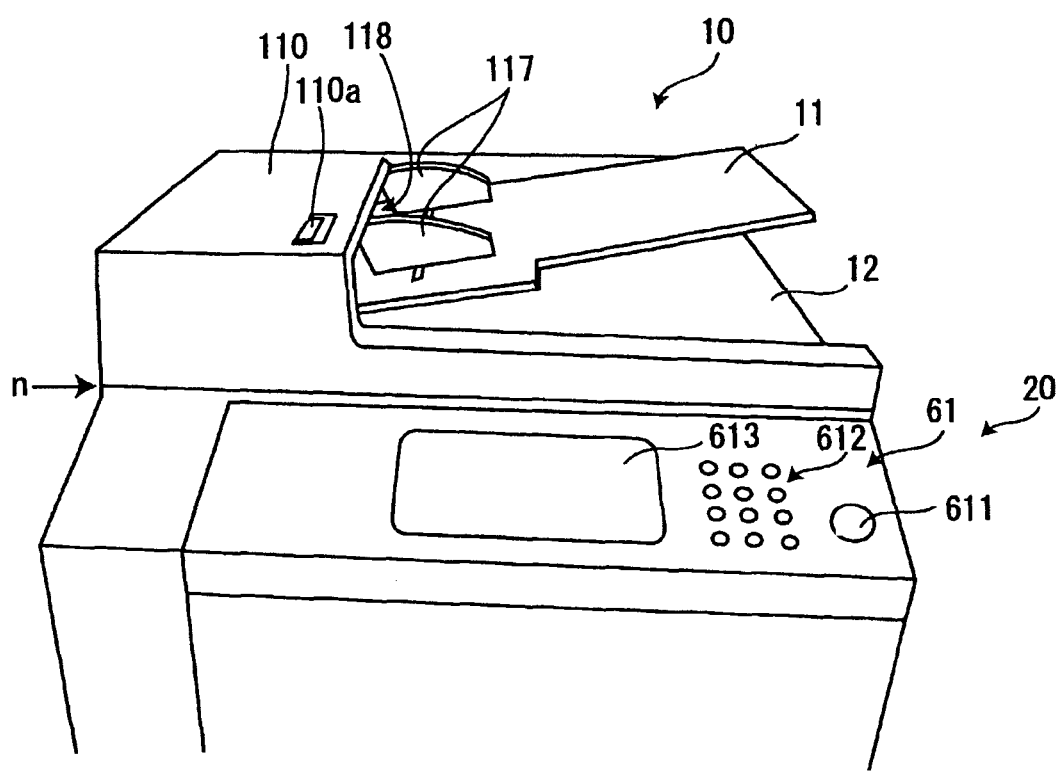
FIG. 13 is a perspective view showing the appearance of an upper part of the copier shown in FIG. 2.

FIG. 13 is a perspective view showing the appearance of an upper part of the copier shown in FIG. 2.

In this figure, the image reading device 10 and the appearance of an upper part of the image forming device 20 are shown.

In the image reading device 10 shown in this FIG. 13, the document tray 11 and the document ejection tray 12 also shown in FIG. 2 are shown. Moreover, in this figure, the guide members 117 are also shown that guide the conveyed document while limiting the position in the direction of the width of the document placed on the document tray 11. The document placed on the document tray 11 has its position in the direction of the width limited by the guide members 117, and when the start button 611 described later is depressed, the document is successively conveyed in sheet by sheet from the document conveyance opening 118 while being guided by the guide members 117. The upper part of this document conveyance opening 118 is covered with an opening and closing cover 110 which is opened when document jamming occurs.

As described above, this image reading device 10 has a structure in which the part above the line n shown in FIG. 13 is lifted up with the back side as a hinge, a document is placed upside down on the transparent glass 14 therebelow (see FIG. 2) under the lifted condition, the lifted upper part is again closed as shown in FIG. 13 and the start button 611 is depressed. Then, in this image reading device 10, reading of the image on the document in the above-described stationary reading mode is performed.

Moreover, on the upper part of the image forming device 20 shown in this FIG. 13, the user interface 61 (refer also to FIG. 1) is shown.

The user interface 61 shown in this FIG. 13 has the above-described start button 611, plurality of setting buttons 612 including a numerical key board and touch panel 613 serving also as a display.

When the start button 611 is depressed, document reading at the image reading device 10 is started. Moreover, with the setting buttons 612, the number of copies, the receiver's FAX number at the time of FAX transmission and the like are set. Further, on the touch panel 613, various settings are made according to the screen displayed thereon.

FIG. 5 is the operation explanation view of the image reading device shown in FIG. 1 and FIG. 2. The description of FIG. 5 related to the first exemplary embodiment is also applied to the present exemplary embodiment. The description is omitted here.

FIGS. 6A to 6D are the explanatory views of the processing contents of the image inclination correction processing. The descriptions of FIGS. 6A to 6D related to the first exemplary embodiment are also applied to the present exemplary embodiment. The descriptions are omitted here.

Figure 14:
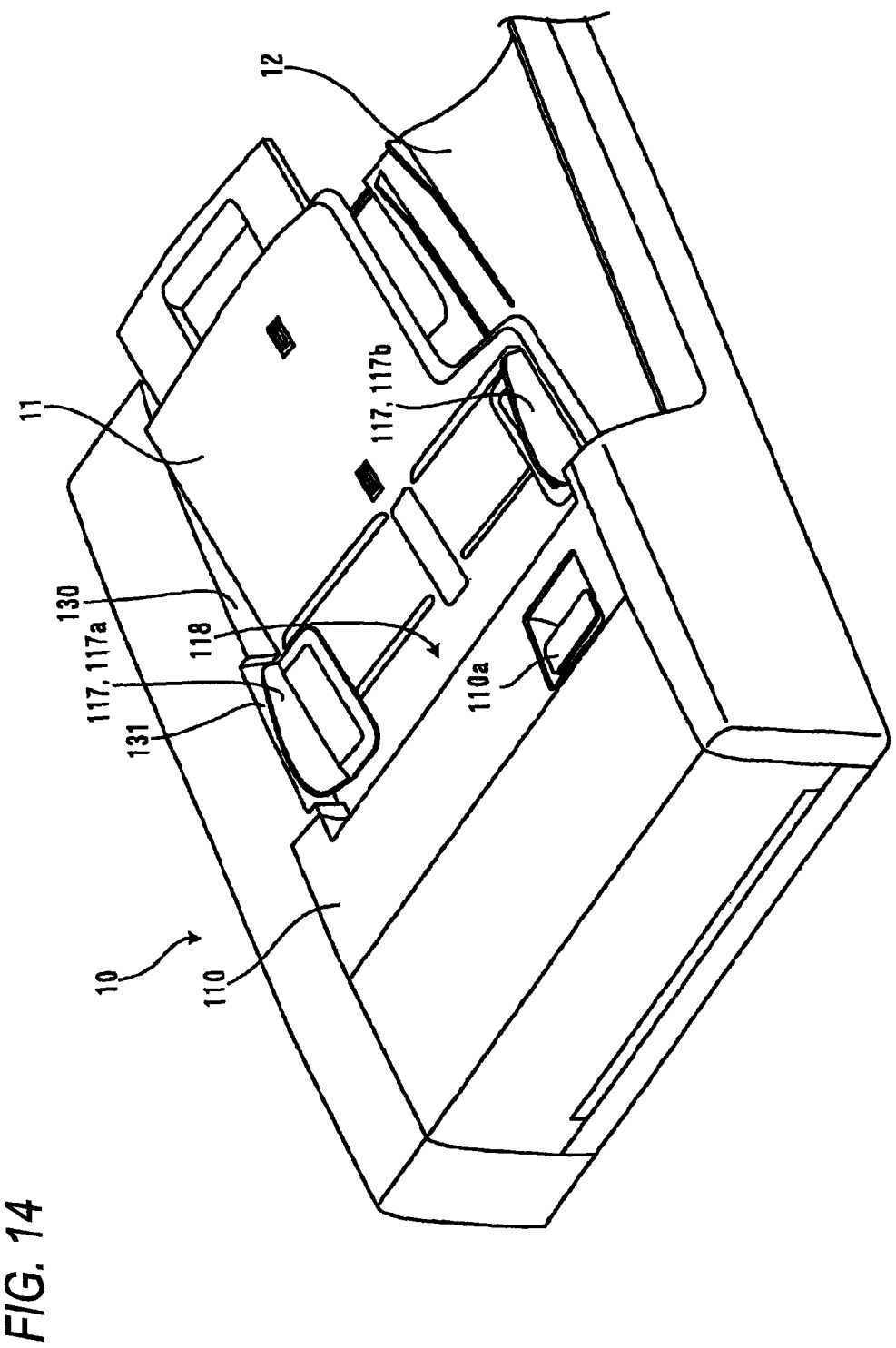
FIG. 14 is a perspective view showing an upper part of the image forming device.

FIG. 14 is a perspective view showing an upper part of the image forming device.

As described with reference to FIG. 13, this image reading device 10 is provided with the document tray 11 and the document ejection tray 12. The document placed on the document tray 11 is conveyed in from the document conveyance opening 118, the image on the document is read as described above, and the document is ejected onto the document ejection tray 12.

Moreover, the document tray 11 is provided with a pair of guide members 117. This pair of guide members 117 are movable in opposite directions in the width direction, and sandwich the document placed on the document tray 11 from both sides in the width direction and push it toward an almost center in the width direction. In conveying the document, they support the document from both sides to guide the conveyance of the document. This pair of guide members 117 will be described later in detail.

Above the document conveyance opening 118, the opening and closing cover 110 opened when document jamming occurs is provided. This opening and closing cover 110 is provided with a handle 110a, and this handle 110a is lifted up with a finger put thereon, whereby this opening and closing cover can be opened.

Moreover, this image reading device 10 is provided with a guide wall 130 protruding along the side edge on the back side of the document tray 11. On this guide wall 130, a recess 131 is formed. When the pair of guide members 117 are opened to the maximum in the width direction, a first guide member 117a, on the back side, of the pair of guide members 117 enters this recess. The first guide member 117a and a second guide member 117b on the front side act so that when one of them is slid by hand, the other is also slid so as to be situated at an equal distance from the center in the width direction of the document tray 11 to thereby push the document toward the center in the width direction. In this example, this is referred to as "center guide". Here, when the first guide member 117a on the back side is slid until it enters the recess 131 of the guide wall 130, it is possible to slide only the second guide member 117b on the front side with the first guide member 117a being in the recess. At this time, the document on the document tray 11 is pushed to a position close to the back side on the document tray 11 while being sandwiched between the guide wall 130 on the back side and the second guide member 117b on the front side. In this example, this is referred to as "corner guide".

Figure 15:
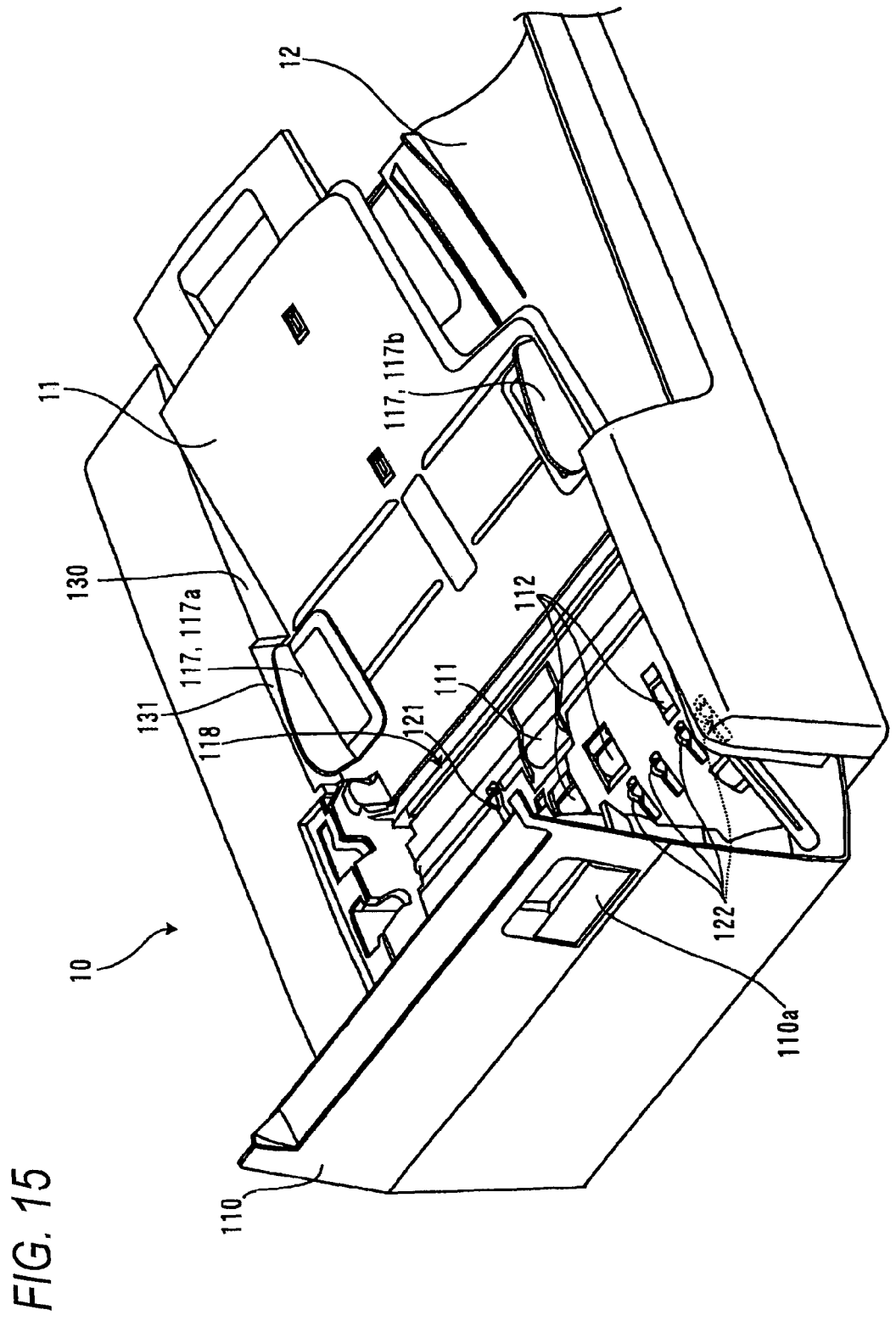
FIG. 15 is a view where an opening and closing cover of the image reading device is opened to show the inside thereof.

FIG. 15 is a view where the opening and closing cover of the image reading device is opened to show the inside thereof.

Directly on the back side of the document conveyance opening 118, the first rolls 111 and the first sensor 121 are provided (refer also to FIG. 5). The first rolls 111 are rolls that first send in the document placed on the document tray 11 sheet by sheet. Moreover, the first sensor 121 is a sensor that falls down by being pushed by the front edge of the document sent in by the first rolls 111 and detects the fall. By this first sensor 121, it is detected that the document is sent in by the first rolls 111.

On the back side of the first rolls 111 and the first sensor 121, the second rolls 112 are provided, and further on the back side thereof, the second sensors 122 are provided. As described with reference to FIG. 5, the second rolls 112 are rolls having a role in correcting the inclination of the document sent in by the first rolls 111 and further sending in the document. Moreover, the second sensors 122 are sensors that fall down by being pushed by the front edge of the document and detect the fall like the first sensor 121, and are aligned two or more in number in the direction of the width of the document. These second sensors 122 are sensors not only detecting that the document has been conveyed through the second rolls 112 but also detecting which width of a document has been conveyed according to by which second sensor of the second sensors 112 it is detected.

Figure 16:
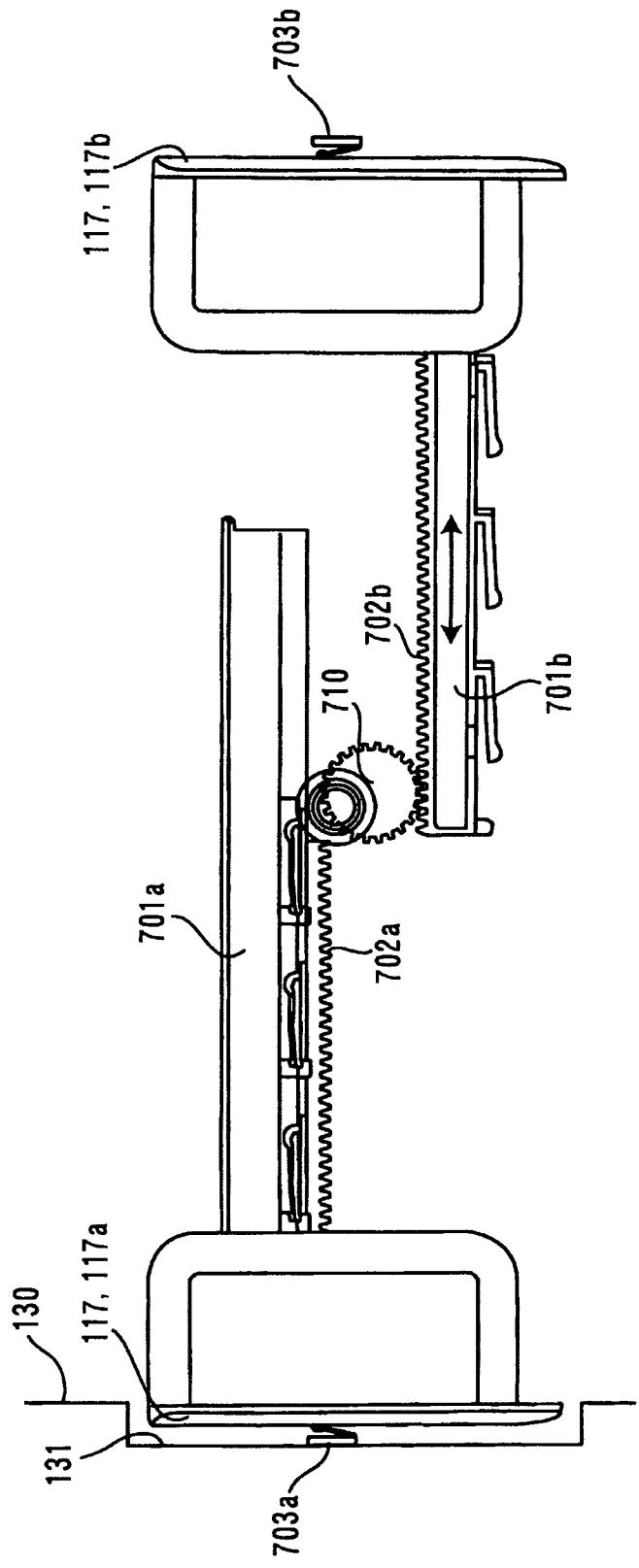
FIG. 16 is a view showing a first example of a switching structure that implements the switching between center guide and corner guide.

FIG. 16 is a view showing a first example of a switching structure that implements the switching between the center guide and the corner guide.

From the first guide member 117a on the back side (the left side in FIG. 16) of the pair of guide members 117, a first slide arm 701a extends toward the second guide member 117b on the front side (the right side in FIG. 16). This first slide arm 701a is provided with a first rack gear 702a. This first slide arm 701a is a member that assists the slide of the first guide member 117a, and slides integrally with the first guide member 117a.

Moreover, from the second guide member 117b, a second slide arm 701b similarly extends toward the first guide member 117a. This second slide arm 701b is also provided with a second rack gear 702b. This second slide arm 701b is a member that guides the slide of the second guide member 117b, and is fixed to the second guide member 117b so as to slide integrally with the second guide member 117b. Between these first slide arm 701a and second slide arm 701b, a pinion gear 710 is provided. With this pinion gear 710, both the first rack gear 702a and the second rack gear 702b provided on the first slide arm 701a and the second slide arm 701b, respectively, engage. However, the first rack gear 702a is shorter than the second rack gear 702b, and when the distance between the first guide member 117a and the second guide member 117b is increased to the maximum until the first guide member 117a enters the recess 131 of the guide wall 130, as shown in this FIG. 15, the first rack gear 702a separates from the pinion gear 710 while the second rack gear 702b is kept engaging with the pinion gear 710. Under this condition where the first rack gear 702a is separated from the pinion gear 710, that is, under the condition where the first guide member 117a is in the recess 131 of the guide wall 130, it is possible to slide only the second guide member 117b. When the second guide member 117b is extended so as to be situated at the maximum front side (the right side in FIG. 16) and the first guide member 117a is then slid so as to be pushed out of the recess 131 under the condition where the first guide member 117a is in the recess 131 of the guide wall 130, the first rack gear 701a engages with the pinion gear 710, so that a condition occurs where the first guide member 117a and the second guide member 117b move in directions in which they approach each other and separate from each other.

In this example, the following are provided: a first limit sensor 703a detecting that the first guide member 117a is in the recess 131 of the guide wall 130; and a second limit sensor 703b detecting that the second guide member 117b is situated at the maximum front side. When the first limit sensor 703a is in an ON condition representing that the first guide member 117a is in the recess 131 and the second limit sensor 703b is in an OFF condition representing that the second guide member 117b is not situated at the maximum front side, it is recognized that this image reading device 10 is in the above-described "corner guide" condition. On the other hand, when both the first guide member 117a and the second guide member 117b are in the OFF condition, it is recognized that the image reading device 10 is in the above-described "center guide" condition.

Even under the condition where the second guide member 117b is not situated in a position moved to the maximum front side (condition where the second limit switch 703b is on), when the first guide member 117a is pushed out of the recess 131, the rack gear 702a on the side of the first guide member 117a engages with the pinion gear 710. When this condition occurs, the document is limited to a halfway position that is neither the "corner guide" nor the "center guide". In the first example shown in FIG. 16, in order to prevent this, when the second limit switch 703b is in the OFF condition, a warning that the first limit switch 703a is changed to off is provided, and it is prompted to perform the operation again from the condition where the second limit switch 703b is on (condition where the second guide member 117b is opened to the maximum).

FIGS. 17A to 17D are views showing a second example of the switching structure that implements the switching between the center guide and the corner guide.

Figure 17A:
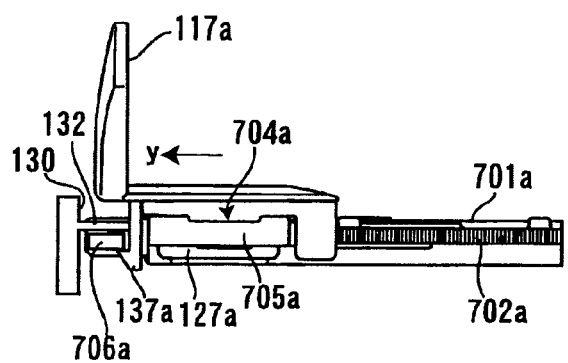
FIGS. 17A, 17B, 17C and 17D are views showing a second example of the switching structure that implements the switching between the center guide and the corner guide.
Figure 17B:
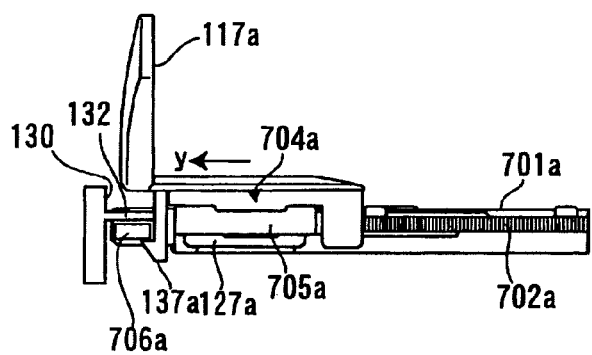
Figure 17C:
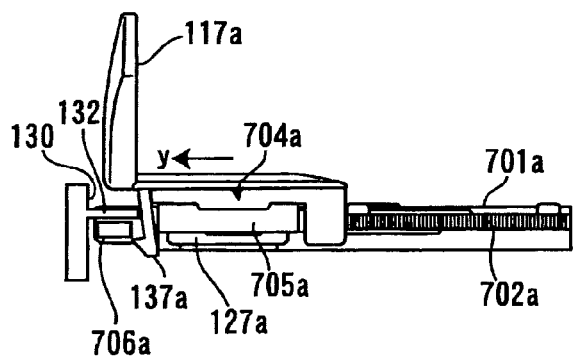
Figure 17D:
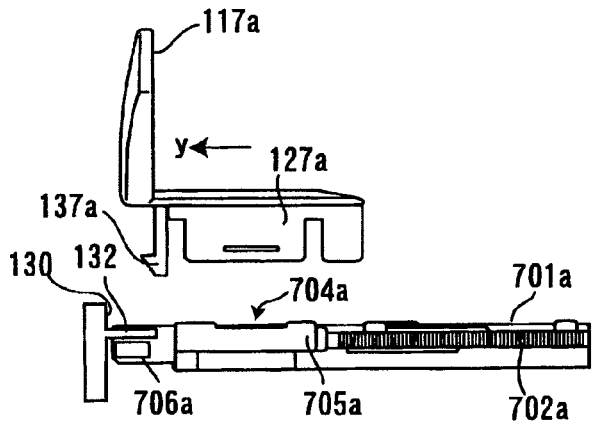

In this second example, the first guide member 117a is attachable and detachable to and from the first slide arm 701a. FIGS. 17A to 17D are schematic views successively showing the operation of the attachment and detachment mechanism from the attached condition (FIG. 17A) to the detached condition (FIG. 17D).

The first slide arm 701a is provided with a fixer 705a for fixing the first guide member 117a. On this fixer 705a, a fixing hole 704a into which an insertion portion 127a of the first guide member 701a is inserted is formed. As shown in FIG. 17A, by the insertion portion 127a of the first guide member 117a being inserted into the fixing hole 704a, the first guide member 117a is fixed to the first slide arm 701a. Moreover, the first guide member 117a is provided with a hook portion 137a. This hook portion 137a is hooked on an engagement protrusion 706a provided on the first slide arm 701a in the fixed condition shown in FIG. 17A, and this prevents the first guide member 117a from coming off.

Further, at a part, extending below the document tray 11, of the guide wall 130 (see FIG. 14 and FIG. 15) constituting part of the housing of the image reading device, a protrusion 132 protruding toward the hook portion 137a is provided.

Here, under the condition where the first guide member 117a is fixed to the first slide arm 701a as shown in FIG. 17A, the first guide member 117a is slid in the direction of the arrow y toward the guide wall 130 (refer also to FIG. 14). Then, as shown in FIG. 17B, the hook portion 137a butts against the protrusion 132, and further, as shown in FIG. 17C, the hook portion 137a is pushed by the protrusion 132 to be bent, so that the hook portion 137a is unhooked from the engagement protrusion 706a. When the first guide member 117a is lifted up with that condition being maintained, as shown in FIG. 17D, the first guide member 117a is detached from the first slide arm 701a.

To attach the first guide member 117a to the first slide arm 701a, the first slide arm 701a is moved to a position not interfering with the protrusion 132 of the guide wall 130, and the first guide member 117a is lowered from the condition of FIG. 17D. Then, the insertion portion 127a of the first guide member 117a enters the fixing hole 704a of the first slide arm 701a, and the hook portion 137a overrides the engagement protrusion 706a while interfering with the engagement protrusion 706a to be bent, and is attached in the condition shown in FIG. 17A.

As in this second example, the switching between the "center guide" and the "corner guide" can also be made by providing the mechanism to attach and detach the first guide member 117a.

The attachment and detachment of the first guide member 117a to and from the first slide arm 701a, that is, the switching between the "center guide" and the "corner guide" is transmitted to this image reading device 10 by a switch (not shown) that detects the attachment and detachment.

Now, the difference in advantages between the "center guide" and the "corner guide" will be described.

In the "center guide", the document placed on the document tray 11 is placed in a position close to the center in the direction of the width of the document tray 11 by the pair of guide members 117 (see FIG. 13 and FIG. 14), conveyed while being guided by the guide members 117, and read. Since these guide members 117 are short in the length in the conveyance direction compared with the guide wall 130 (see FIG. 14) and are movable in the width direction, the document is apt to incline obliquely compared with the case where it is guided by the guide wall 130. If the document is conveyed while being inclined obliquely, there is a possibility that it partly lies outside the width of document reading by the reading sensor 136 (see FIG. 5). In that case, part of the image is not read and a partly missing image is obtained. On the contrary, in the case of a "side guide", the posture of the document is easily stabilized, and the possibility is low that the document is conveyed while being inclined obliquely. However, in the case of the "side guide", one side edge of the document continuously slides on members during the whole of the conveyance as well as on the guide wall 130, stress is placed on the document, paper powder is largely caused, the paper powder is apt to accumulate in the device, this affects reading and image missing due to the paper powder easily occurs.

Therefore, in the present exemplary embodiment, basically, the "center guide" is used in the case of normal size documents. In the case of long documents, if there is an inclination, even if the inclination is small, a large lateral shift occurs between the front edge and the rear edge; therefore, switching to the "corner guide" is made. The "center guide" and the "corner guide" in the present exemplary embodiment correspond to examples of the "first conveyance mode" and the "second conveyance mode" referred to in the present invention, respectively.

Next, the image reading operation in the present exemplary embodiment will be described.

Figure 18:
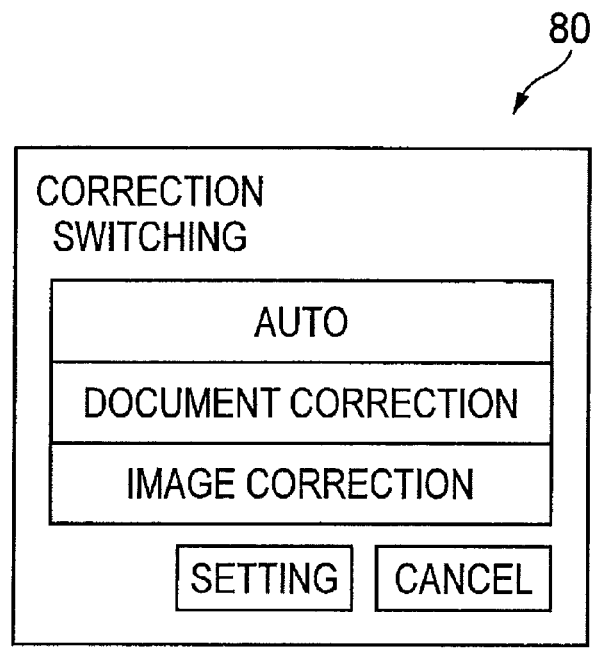
FIG. 18 is a view showing the correction switching setting screen.

FIG. 18 is a view showing the correction switching setting screen. This correction switching setting screen 80 is a screen displayed on the touch panel 613 (see FIG. 13) at the time of the initial setting operation by the user.

On this correction switching setting screen 80, the push buttons "auto", "document correction" and "image correction" are aligned. Further on this screen, the "setting" button and the "cancel" button are also displayed. In this example, description of the "auto" will be given later, and the "document correction" and the "image correction" will be described first. The "document correction" is a push button to set the first correction mode to correct the inclination of the conveyed document which mode has been described with reference to FIG. 5. Moreover, the "image correction" is a push button to set the second correction mode to correct the inclination of the image based on the image signal obtained by document reading which mode has been described with reference to FIGS. 6A to 6D. The "auto" is a push button to set automatic switching between the first correction mode and the second correction mode according to a condition described later.

When a pushbutton among the "auto", the "document correction" and the "image correction is depressed on the correction switching setting screen 80 shown in this FIG. 18 and the "setting" button is further depressed, according to the depressed push button, any of the "auto", the "document correction" and the "image correction" is set, and this correction switching setting screen 80 disappears from the touch panel 613. When the "cancel" button is depressed, this correction switching setting screen 80 disappears from the touch panel 613 without any new setting being made. However, the "setting" referred to here also indicates "storage" into a storage portion (not shown) provided in the circuit portion 70 shown in FIG. 2. The preparation for the actual operation based on the storage contents is performed separately. Details will be described later.

Here, the setting on the correction switching setting screen 80 shown in FIG. 18 is an initial setting, and once set, it is effective until the next re-setting even if the job is repeated any number of times.

Figure 19:
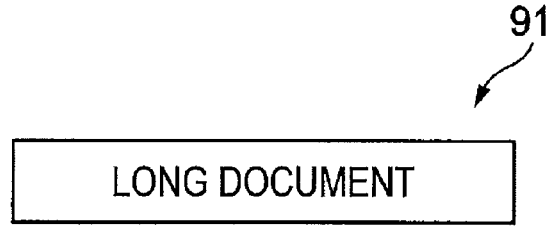
FIG. 19 is a view showing the long document setting button.

FIG. 19 is a view showing the long document setting button.

In the present exemplary embodiment, when a document whose length in the conveyance direction is not less than a predetermined length (as an example, 440 mm) is placed on the document tray 11 and the document is read, the setting of the long mode is made. This long mode setting is made by depressing the long document setting button 91 shown in FIG. 19 which button 91 is displayed on the touch panel 613. Unlike the correction switching setting shown in FIG. 18, this long mode setting is made at each reading job prior to the reading. When the document reading of the job is finished, the setting of being in the long mode is canceled to return to the mode to read a normal size document shorter than the long document.

While in this example, it is described that for the setting of the long mode, the long document setting button 91 shown in FIG. 19, displayed on the touch panel 613 is depressed, the long document setting button may be provided as one of the setting buttons 612 on the user interface 61 shown in FIG. 13. Alternatively, a sensor detecting that a long document is placed on the document tray 11 may be provided to spare the user the trouble of making setting.

Figure 20:
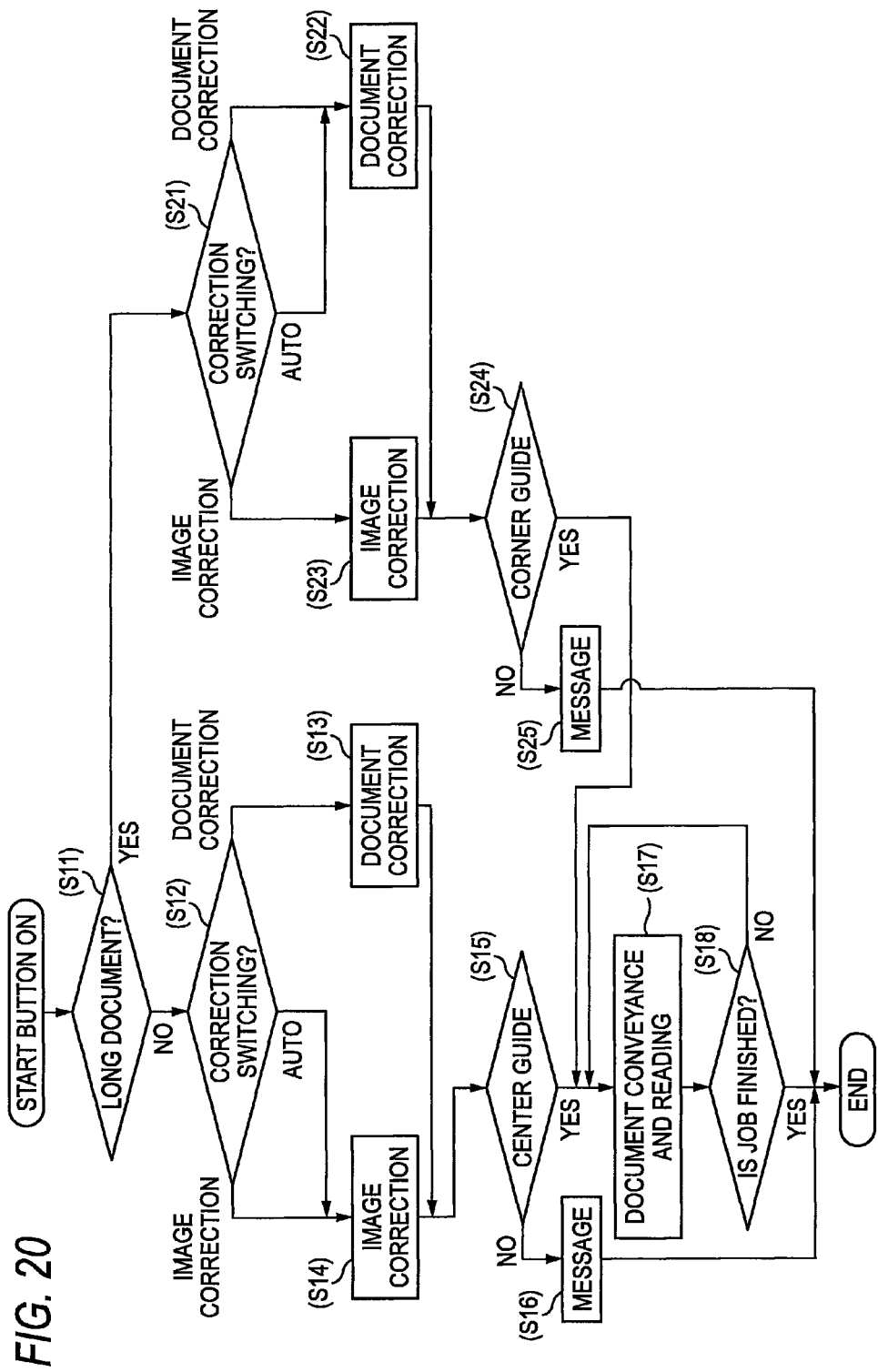
FIG. 20 is a flowchart showing a first example of an operation sequence of the image reading device included in the multifunction apparatus of the present exemplary embodiment when a start button shown in FIG. 13 is depressed.

FIG. 20 is a flowchart showing a first example of the operation sequence of the image reading device included in the multifunction apparatus of the present exemplary embodiment when the start button shown in FIG. 13 is depressed.

In this example, first, one or more than one sheet of document is placed on the document tray 11. Then, when the placed document is a long document, the long document setting button 91 shown in FIG. 19 is depressed. Then, when the start button 611 shown in FIG. 13 is depressed, the operation according to the operation sequence shown in this FIG. 20 is executed.

In this example, as the initial setting, one of the "auto", the "document correction" and the "image correction" has already been set on the correction switching setting screen 80 shown in FIG. 18.

When the execution of the operation according to the operation sequence shown in this FIG. 20 is started, first, a determination as to whether the current job is a long document (see FIG. 19) or not is performed (step S11).

When it is determined that the job is not a long document, the process proceeds to step S12, and it is determined to which of the "auto", the "document correction" and the "image correction" the correction switching (see FIG. 18) is set (step S12). Here, the "setting" on the correction switching setting screen 80 indicates, as mentioned above, storing inside the setting by the user operation. When the "document correction" is set (stored), setting of the operation of the "document correction" according to the first correction mode to correct the inclination of the document which mode has been described with reference to FIG. 5 is performed (step S13), whereas when it is determined at step S12 that the "image correction" is set, setting of the operation of the "image correction" according to the second correction mode to correct the inclination of the image based on the image signal obtained by reading which mode has been described with reference to FIGS. 6A to 6D is performed (step S14). Moreover, when it is determined at step S12 that the "auto" is set, since the document is not a long document in this case (step S11), the "image correction" is set. The setting of the "document correction" at step S13 or the setting of the "image correction" at step S14 indicates a concrete preparation for the actual correction operation.

When the setting of the "document correction" at step S13 or the setting of the "image correction" at step S14 is performed, the process proceeds to step S15, and it is determined whether the first guide member 117*a* (see FIG. 13 and FIG. 14) is in the "center guide" condition or not (step S15). When it is not in the "center guide" condition, a message to prompt a change to the "center guide" is provided on the touch panel 613 (see FIG. 13), and this operation sequence is ended.

In the present exemplary embodiment, when the document is not a long document, the "center guide" is selected in either of the cases of the "document correction" and the "image correction".

When it is determined at step S15 that the first guide member 117*a* is in the "center guide" condition, the process proceeds to step S17, and document conveyance and reading are repeated sheet by sheet until the current job is finished (step S18) while the set "document correction" or "image correction" is being executed.

When it is determined at step S11 that the current job is a long document, the process proceeds to step S21 where it is also determined to which of the "auto", the "document correction" and the "image correction" the correction switching (see FIG. 18) is set. When the "document correction" is set (stored), setting of the operation of the "document correction" according to the first correction mode to correct the inclination of the document which mode has been described with reference to FIG. 5 is performed (step S22). On the other hand, when it is determined at step S21 that the "image correction" is set (stored), setting of the operation of the "image correction" according to the second correction mode to correct the inclination of the image based on the image signal which mode has been described with reference to FIGS. 6A to 6D is performed. Since the document is a long document in this case, in the case of the "auto", the process proceeds to the "document correction" (step S22). Here, the setting of the "document correction" at step S22 or the setting of the "image correction" at step S23 indicates a concrete preparation for the actual correction operation as in the cases of steps S13 and S14.

When the setting of the "document correction" at step S22 or the setting of the "image correction" at step S23 is performed, the process proceeds to step S24, and it is determined whether the guide members 117 (see FIG. 13 and FIG. 14) are in the "corner guide" condition or not (step S24). In the present exemplary embodiment, when the document is a long document, the "corner guide" is selected in either of the cases of the "document correction" and the "image correction". When the guide members 117 are not in the "corner guide" condition, a message to prompt a change to the "corner guide" is provided on the touch panel 613 (see FIG. 13) (step S25), and this operation sequence is ended. When it is determined at step S24 that the guide members 117 are in the "corner guide" condition, the process proceeds to step S17, and document conveyance and reading are repeated sheet by sheet until the current job is finished (step S18) while the set "document correction" or "image correction" is being executed.

FIG. 21 is a flowchart showing a second example of the operation sequence of the image reading device when the start button shown in FIG. 13 is depressed. A difference from the first example shown in FIG. 20 will be described herein.

The correction switching setting (see FIG. 18) is also made by initial setting in this example, and whether the current job is a long document or not (see FIG. 19) is set. When the start button 611 is depressed thereafter, the operation sequence shown in FIG. 21 is executed instead of the operation sequence of FIG. 20.

The difference of the operation sequence of the second example shown in this FIG. 21 from the operation sequence of the first example shown in FIG. 20 is only the following one: In the case of the operation sequence of the first example shown in FIG. 20, in the case of a long document (step S11), even when the "document correction" is set (step S22), being the corner guide is required as in the case where the "image correction" is set (step S24). On the contrary, in the operation sequence of the second example shown in FIG. 21, even in the case of a long document (step S11), when the "document correction" is set (step S22), document conveyance and reading are performed regardless of being in the "corner guide" or the "center guide" (steps S17 and S18). That is, in this second example, since the posture of the document is corrected by the "document correction" even in the case of a long document, document conveyance and reading are performed even in the case of the "center guide".

While the operation sequence of the image reading device 10 are described in this example, this operation sequence does not question the transmission destination of the image signal obtained by reading by the image reading device 10 but the image signal may be sent to the image forming device 20 so that it is used for copy image formation. Alternatively, the image signal may be transmitted by facsimile through the FAX interface 50 (see FIG. 1) or may be transmitted to a personal computer or the like through the I/O interface 40.

Moreover, while a multifunction apparatus including an example of the image reading device of the present invention and an example of the copier of the present invention is described in this example, the present invention is also applicable to a single-function image reading device or copier.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image reading device comprising:
   a supplying tray on which a document is placed;
   a document conveyer that successively conveys the document placed on the supplying tray toward a reading position;
   a plurality of detection sensors that are provided at a front side of the supplying tray in a conveyance direction of the document, wherein the plurality of detection sensors detect a front edge of the document in the conveyance direction when the document is placed on the supplying tray but prior to the document being conveyed by the document conveyer; and
   a document reading portion that reads an image on the document passing the reading position, and generates an image signal.

2. The image reading device according to claim 1, comprising:
   a first inclination correcting portion that is disposed on an upstream side of the reading position, of the document conveyance by the document conveyer, and corrects an inclination of the document in response to butting of the front edge of the conveyed document; and
   a correction switching controller that switches between a first correction mode in which the first inclination correcting portion is actuated and a second correction mode in which the first inclination correcting portion is not actuated,
   wherein the correction switching controller makes switching to the first correction mode when one detection sensor of the plurality of detection sensors detects the front edge of the document, and makes switching to the second correction mode when more than one detection sensor of the plurality of detection sensors detects the front edge of the document.

3. The image reading device according to claim 2, having a long mode to read a long document whose length in the conveyance direction is longer than a predetermined length,
   wherein when not in the long mode, even when one detection sensor of the plurality of detection sensors detects the front edge of the document, the correction switching controller makes switching to the second correction mode.

4. The image reading device according to claim 2, comprising a second inclination correcting portion that calculates, based on an image signal generated by the document reading portion, an image inclination amount represented by the image signal, and generates a new image signal representative of an inclination-corrected image based on the calculated inclination amount,
   wherein the correction switching controller alternatively switches between the inclination correction by the first inclination correcting portion and the inclination correction by the second inclination correcting portion.

5. The image reading device according to claim 1, comprising:
   a first inclination correcting portion that is disposed on an upstream side of the reading position, of the document conveyance by the document conveyer, and corrects an inclination of the document in response to butting of the front edge of the conveyed document;
   a correction switching controller that switches between a first correction mode in which the first inclination correcting portion is actuated and a second correction mode in which the first inclination correcting portion is not actuated; and
   an operation start controller that, in response to an instruction to start a reading operation of the document placed on the supplying tray, starts the reading operation when one detection sensor of the plurality of detection sensors detects the front edge of the document when in the first correction mode, and starts the reading operation when more than one detection sensor of the plurality of detection sensors detects the front edge of the document when in the second correction mode.

6. The image reading device according to claim 5, having a long mode to read a long document whose length in the conveyance direction is longer than a predetermined length,
   wherein when in the long mode, the operation start controller inhibits the reading operation also in the first correction mode when only one detection sensor of the plurality of detection sensors detects the front edge of the document, and starts the reading operation when more than one detection sensor of the plurality of detection sensors detects the front edge of the document.

7. The image reading device according to claim 5, having a long mode to read a long document whose length in the conveyance direction is longer than a predetermined length,
   wherein when not in the long mode, even when only one detection sensor of the plurality of detection sensors detects the front edge of the document in the second correction mode, the correction switching controller starts the reading operation.

8. The image reading device according to claim 1, comprising an operation start mode switcher that switches between a first operation start mode in which a reading operation is started when one detection sensor of the plurality of detection sensors detects the front edge of the document and a second operation start mode in which the reading operation is started when more than one detection sensor of the plurality of detection sensors detects the front edge of the document, and having a long mode to read a long document,
wherein when in the long mode, the operation start mode switcher makes switching to the second operation start mode when in the first operation start mode.

9. A copier comprising:
the image reading device according to claim 1; and
an image forming device that forms on a sheet an image based on an image signal generated by the image reading device.

10. A copier comprising:
the image reading device according to claim 1; and
an image forming device that forms on a sheet a copy image based on an image signal generated by the image reading device,
wherein:
the image forming device includes a setter that sets the number of copies of the copy image formed on the sheet, and
the image reading device includes an operation start mode switcher that switches between:
a first operation start mode in which a reading operation is started when one detection sensor of the plurality of detection sensors detects the front edge of the document, and
a second operation start mode in which the reading operation is started when more than one detection sensor of the plurality of detection sensors detects the front edge of the document.

11. The copier of claim 10, wherein, when the number of copies of the copy image set by the setter is greater than or equal to a preset number of copies, the operation start mode switcher switches from the first operation start mode to the second operation start mode.

12. An image reading device comprising:
a document supplying tray comprising a plate on which a document is placed;
a guide wall that protrudes along one side edge, of the plate, in a width direction intersecting a conveyance direction of the document placed on the plate and guides conveyance of the document while being in contact with a side edge of the document; and
a pair of guide members that are movable in opposite directions in the width direction and guide the conveyance of the document by sandwiching the document placed on the plate from both sides in the width direction and pushing the document toward an almost center of the plate in the width direction;
a document conveyer that successively conveys the document placed on the plate so as to pass a reading position;
a document reading portion that reads the image on the document passing the reading position, the image reading device being configured to operate in a long mode to read a long document whose length in the conveyance direction exceeds a predetermined length; and
a document conveyance permitting and unpermitting portion that:
when in the long mode, permits the document conveyance when the long document is placed in a position close to the guide wall on the plate and the long document is conveyed while being guided by the guide wall, and
when not in the long mode, permits the document conveyance when the document is placed in a position close to the center in the width direction on the plate by the pair of guide members and the document is conveyed while being guided by the pair of guide members.

13. The image reading device according to claim 12, comprising:
a first inclination correcting portion disposed on an upstream side of the reading position, of the document conveyance by the document conveyer, and corrects an inclination of the document in response to butting of a front edge of the conveyed document; and
a correction mode switching portion that switches between a first correction mode in which the first inclination correcting portion is actuated and a second correction mode in which the first inclination correcting portion is not actuated,
wherein even in the long mode, when switching to the first correction mode has been made by the correction mode switcher, the document conveyance permitting and unpermitting portion also permits the document conveyance both when in the first conveyance mode and when in the second conveyance mode.

14. The image reading device according to claim 13, comprising a second inclination correcting portion that calculates, based on an image signal generated by the document reading portion, an image inclination amount represented by the image signal, and generates a new image signal representative of an inclination-corrected image based on the calculated inclination amount,
wherein the correction mode switcher alternatively switches between the inclination correction by the first inclination correcting portion and the inclination correction by the second inclination correcting portion.

15. The image reading device according to claim 12,
wherein the guide wall has an accommodation portion that accommodates the first guide member to enable the guide wall to guide the document, and
the pair of guide members are members switchable between a first movement mode in which the first guide member is accommodated in the accommodation portion and only the second guide member, other than the first guide member, of the pair of guide members is moved in the width direction and a second movement mode in which the first guide member and the second guide member are moved in opposite directions in the width direction of the plate.

16. The image reading device according to claim 12,
wherein the first guide member is attachable and detachable to and from the plate in a position where the first guide member is situated close to the guide wall.

17. A copier comprising:
the image reading device according to claim 12; and
an image forming device that forms on a sheet an image based on an image signal generated by the image reading device.

* * * * *